US 9,772,401 B2

(12) United States Patent
Widmer et al.

(10) Patent No.: US 9,772,401 B2
(45) Date of Patent: Sep. 26, 2017

(54) SYSTEMS, METHODS, AND APPARATUS FOR RADAR-BASED DETECTION OF OBJECTS IN A PREDETERMINED SPACE

(71) Applicant: QUALCOMM Incorporated, San Diego, CA (US)

(72) Inventors: Hanspeter Widmer, Wohlenschwil (CH); Lukas Sieber, Olten (CH); Andreas Daetwyler, Unterentfelden (CH); Markus Bittner, Sarmenstorf (CH)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 14/335,296

(22) Filed: Jul. 18, 2014

(65) Prior Publication Data
US 2015/0260835 A1    Sep. 17, 2015

Related U.S. Application Data

(60) Provisional application No. 61/954,287, filed on Mar. 17, 2014.

(51) Int. Cl.
*G01S 13/88* (2006.01)
*G01S 13/93* (2006.01)
(Continued)

(52) U.S. Cl.
CPC ............ *G01S 13/04* (2013.01); *B60L 11/182* (2013.01); *G01S 7/032* (2013.01); *G01S 13/003* (2013.01);
(Continued)

(58) Field of Classification Search
CPC .......... G01S 13/86; G01S 13/88; G01S 13/93; G01S 2013/9314; G01S 2013/936;
(Continued)

(56) References Cited

U.S. PATENT DOCUMENTS 3,914,562 A * 10/1975 Bolger ............... B60K 1/04
191/10
5,573,090 A * 11/1996 Ross ................. B60L 5/005
180/2.1
(Continued)

FOREIGN PATENT DOCUMENTS

WO    WO-2011006758 A2    1/2011
WO    WO-2012148450 A1    11/2012
WO    WO-2014011788 A1    1/2014

OTHER PUBLICATIONS

International Search Report and Written Opinion—PCT/US2015/016871—ISA/EPO—dated Jul. 6, 2015.
(Continued)

*Primary Examiner* — Peter Bythrow
(74) *Attorney, Agent, or Firm* — Knobbe, Martens, Olson & Bear, LLP

(57) ABSTRACT

This disclosure provides apparatuses and methods for detecting foreign objects. An apparatus for detecting a presence of an object comprises at least one radar antenna attached to a wirelessly chargeable vehicle. The at least one radar antenna is configured to transmit a radar signal into a space between a wireless power receiver of the vehicle and a wireless charger as the vehicle moves in a primary direction of movement of the vehicle and receive the radar signal. The apparatus further comprises a radar processing circuit configured to determine a presence of the object in the space based on at least one characteristic of the received radar signal. The radar processing circuit is further configured to provide an indication to receive power from the wireless charger based at least in part on the determining the presence of the object.

28 Claims, 29 Drawing Sheets

(51) Int. Cl.
    *H02J 7/00* (2006.01)
    *G01S 13/04* (2006.01)
    *H04B 5/00* (2006.01)
    *G01S 7/03* (2006.01)
    *G01S 13/00* (2006.01)
    *B60L 11/18* (2006.01)
    *H02J 7/02* (2016.01)
    *H02J 50/12* (2016.01)
    *H02J 50/90* (2016.01)
    *H02J 50/80* (2016.01)
    *H02J 50/60* (2016.01)
    *H02J 5/00* (2016.01)

(52) U.S. Cl.
    CPC .............. *G01S 13/88* (2013.01); *H02J 5/005* (2013.01); *H02J 7/0027* (2013.01); *H02J 7/025* (2013.01); *H02J 50/12* (2016.02); *H02J 50/60* (2016.02); *H02J 50/80* (2016.02); *H02J 50/90* (2016.02); *H04B 5/0037* (2013.01)

(58) Field of Classification Search
    CPC ............... G01S 13/04; G01S 13/56; B60L 2230/00–2230/40; B60L 11/1809; B60L 11/182; B60L 11/1824–11/185; H02J 7/0052; H02J 7/0057; H02J 7/00; H02J 7/0027; B60K 1/04; B60K 6/28
    USPC .......................................................... 342/22
    See application file for complete search history.

(56) References Cited

U.S. PATENT DOCUMENTS

| | | | | |
|---|---|---|---|---|
| 5,680,048 | A * | 10/1997 | Wollny | F41H 11/12 324/329 |
| 5,821,731 | A * | 10/1998 | Kuki | B60L 11/1805 320/108 |
| 7,333,045 | B1 * | 2/2008 | Aomori | G01S 13/88 342/175 |
| 8,174,429 | B2 * | 5/2012 | Steinway | G01S 13/888 324/329 |
| 8,749,334 | B2 * | 6/2014 | Boys | B60L 8/006 336/84 C |
| 8,842,035 | B2 * | 9/2014 | Duvoisin, III | G01S 13/885 324/326 |
| 2009/0096413 | A1 * | 4/2009 | Partovi | H01F 5/003 320/108 |
| 2009/0243397 | A1 | 10/2009 | Cook et al. | |
| 2010/0045450 | A1 * | 2/2010 | Suzuki | B60K 1/04 340/438 |
| 2010/0117596 | A1 * | 5/2010 | Cook | B60L 11/182 320/108 |
| 2010/0265117 | A1 * | 10/2010 | Weiss | G01S 13/003 342/22 |
| 2011/0022222 | A1 * | 1/2011 | Tonegawa | B60L 8/003 700/232 |
| 2011/0074346 | A1 * | 3/2011 | Hall | B60L 3/00 320/108 |
| 2011/0128015 | A1 * | 6/2011 | Dorairaj | H02J 5/005 324/629 |
| 2011/0163542 | A1 * | 7/2011 | Farkas | B60L 11/005 290/2 |
| 2011/0254377 | A1 * | 10/2011 | Wildmer | B60L 11/182 307/104 |
| 2011/0254503 | A1 * | 10/2011 | Widmer | B60L 11/182 320/108 |
| 2011/0285349 | A1 * | 11/2011 | Widmer | B60L 11/182 320/108 |
| 2011/0302078 | A1 * | 12/2011 | Failing | B60L 3/00 705/39 |
| 2012/0025602 | A1 | 2/2012 | Boys et al. | |
| 2012/0025603 | A1 * | 2/2012 | Boys | B60L 11/182 307/9.1 |
| 2012/0112531 | A1 * | 5/2012 | Kesler | B60L 11/182 307/9.1 |
| 2012/0119576 | A1 * | 5/2012 | Kesler | B60L 11/182 307/10.1 |
| 2012/0153894 | A1 * | 6/2012 | Widmer | H04B 5/0037 320/108 |
| 2012/0161696 | A1 * | 6/2012 | Cook | B60L 11/182 320/108 |
| 2012/0187757 | A1 * | 7/2012 | Wechlin | B60L 11/182 307/9.1 |
| 2012/0200151 | A1 * | 8/2012 | Obayashi | B60L 11/123 307/9.1 |
| 2012/0203410 | A1 * | 8/2012 | Wechlin | B60L 11/182 701/22 |
| 2012/0206098 | A1 * | 8/2012 | Kim | B60L 11/182 320/108 |
| 2012/0248892 | A1 | 10/2012 | Covic et al. | |
| 2012/0262002 | A1 * | 10/2012 | Widmer | H04B 5/0037 307/104 |
| 2012/0306443 | A1 * | 12/2012 | Smith | H02J 7/00 320/109 |
| 2012/0313742 | A1 * | 12/2012 | Kurs | B60L 11/182 336/180 |
| 2013/0026848 | A1 * | 1/2013 | Ito | B60L 11/182 307/104 |
| 2013/0076296 | A1 * | 3/2013 | Ushiroda | B60L 3/12 320/101 |
| 2013/0282472 | A1 * | 10/2013 | Penilla | B60S 5/06 705/14.35 |
| 2013/0293026 | A1 * | 11/2013 | Miyamoto | G01V 3/10 307/104 |
| 2014/0002015 | A1 * | 1/2014 | Tripathi | B60L 11/182 320/108 |
| 2014/0015328 | A1 * | 1/2014 | Beaver | B60L 11/182 307/104 |
| 2014/0015329 | A1 | 1/2014 | Widmer et al. | |
| 2014/0015522 | A1 | 1/2014 | Widmer et al. | |
| 2014/0021912 | A1 * | 1/2014 | Martin | B60L 11/1833 320/109 |
| 2014/0091755 | A1 * | 4/2014 | Walley | H02J 7/025 320/108 |
| 2014/0132210 | A1 * | 5/2014 | Partovi | H02J 7/025 320/108 |
| 2014/0159501 | A1 * | 6/2014 | Kanno | H02J 17/00 307/104 |
| 2014/0167689 | A1 * | 6/2014 | Niizuma | B60L 11/182 320/108 |
| 2014/0174870 | A1 * | 6/2014 | Niizuma | H02J 5/005 191/10 |
| 2014/0203768 | A1 * | 7/2014 | Andic | H02J 7/00 320/108 |
| 2014/0217966 | A1 * | 8/2014 | Schneider | B60L 11/1829 320/108 |
| 2014/0246918 | A1 * | 9/2014 | Shijo | H01F 38/14 307/104 |
| 2015/0094887 | A1 * | 4/2015 | Kawashima | B60L 11/182 701/22 |
| 2015/0255205 | A1 * | 9/2015 | Islinger | H01F 27/266 336/92 |
| 2016/0368387 | A1 * | 12/2016 | Pavlovsky | B60L 11/1811 |
| 2017/0001527 | A1 * | 1/2017 | Prokhorov | B60L 11/182 |
| 2017/0008409 | A1 * | 1/2017 | Roberts | B60L 11/1829 |

OTHER PUBLICATIONS

Partial International Search Report—PCT/US2015/016871—ISA/EPO—dated May 4, 2015.
Van Trees, H.L., "Detection, Estimation, and Modulation Theory—Part I", John Wiley & Sons, Inc., 2001, 25 Pages.

* cited by examiner

SYSTEMS, METHODS, AND APPARATUS FOR RADAR-BASED DETECTION OF OBJECTS IN A PREDETERMINED SPACE

CLAIM OF PRIORITY UNDER 35 U.S.C. §119

The present application for patent claims priority to Provisional Application No. 61/954,287 entitled "SYSTEMS, METHODS AND APPARATUS FOR RADAR-BASED DETECTION OF OBJECTS IN A PREDETERMINED SPACE" filed Mar. 17, 2014, and assigned to the assignee hereof. Provisional Application No. 61/954,287 is hereby expressly incorporated by reference herein.

FIELD

The present disclosure relates generally to wireless power transfer, and more specifically to devices, systems, and methods related to wireless power transfer from a ground based charging unit to a vehicle based charging unit. More specifically the present disclosure relates to the detection of foreign objects in a predetermined space using radar-based techniques.

BACKGROUND

Inductive power transfer (IPT) systems provide one example of wireless transfer of energy. In IPT, a primary (or "transmitter") power device transmits power to a secondary (or "receiver") power device. Each of the transmitter and receiver power devices include an inductive coupler, typically a single coil or a multi coil arrangement of windings comprising electric current conveying materials. An alternating current passing through the primary inductor produces an alternating magnetic field. When the secondary inductor is placed in proximity to the primary inductor, the alternating magnetic field induces an electromotive force (EMF) in the secondary inductor according to Faraday's law, thereby transferring power to the secondary power receiver device. Typically, frequencies in the very low frequency (VLF) or low frequency (LF) bands e.g. in the range from 20 kHz to 150 kHz, are used for IPT in vehicle charging applications.

Inductive power transfer to vehicles at power levels of several kilowatts in both domestic and public parking zones may require special protective measures for safety of persons and equipment in proximity. Such measures may include detection of foreign objects in the critical space of an IPT system, especially where such foreign objects are subject to excessive eddy currents and heating if exposed to strong alternating magnetic fields. This may be particularly true for systems where the critical space is open and accessible. Such measures may also include detection of living objects, for example humans, extremities of humans, or animals, to protect them from exposure to such strong electromagnetic fields.

The critical space of an IPT system may be defined as the space where electromagnetic field levels exceed certain critical levels. These levels may be based on regulatory limits for human exposure, magnetic flux density limits determined by eddy current heating effects in foreign metallic objects, or other limits such as those specified by a standard applicable to a particular product or to a particular use case. As such, systems, methods, and apparatuses for radar-based detection of objects in a predetermined space are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for detecting a presence of an object. The apparatus comprises a printed circuit board. The apparatus comprises at least one radar transmit antenna disposed on a center portion of the printed circuit board. The apparatus comprises a plurality of radar receive antennas disposed on a periphery of the printed circuit board, each configured to receive a radar signal from the at least one radar transmit antenna. The apparatus comprises a first transmit coil of a wireless charger disposed over the printed circuit board.

Another aspect of the disclosure provides an implementation of a method for operating an apparatus for detecting a presence of an object. The method comprises transmitting a radar signal from at least one radar transmit antenna disposed on a center portion of a printed circuit board. The method comprises receiving the radar signal utilizing at least a subset of a plurality of radar receive antennas disposed on a periphery of the printed circuit board. The method comprises determining a presence of the object utilizing a radar processing circuit based on at least one characteristic of the received radar signal. The method comprises supplying power to a first transmit coil of a wireless charger disposed over the printed circuit board based at least in part on the determining the presence of the object.

Yet another aspect of the disclosure provides an apparatus for detecting a presence of an object. The apparatus comprises at least one radar antenna attached to a wirelessly chargeable vehicle and configured to transmit a radar signal into a space between a wireless power receiver of the vehicle and a wireless charger as the vehicle moves in a primary direction of movement of the vehicle. The at least one radar antenna is further configured to receive the radar signal. The apparatus further comprises a radar processing circuit configured to determine a presence of the object in the space based on at least one characteristic of the received radar signal. The radar processing circuit is further configured to provide an indication to receive power from the wireless charger based at least in part on the determining the presence of the object.

Yet another aspect of the disclosure provides an implementation of a method for operating an apparatus for detecting a presence of an object. The method comprises transmitting a radar signal from at least one antenna of a plurality of radar antennas arranged in an array on a printed circuit board. The method comprises transmitting a radar signal utilizing at least one radar antenna on a vehicle into a space between a wireless power receiver of the vehicle and a wireless charger as the vehicle moves in a primary direction of movement of the vehicle. The method comprises receiving the radar signal utilizing the at least one radar antenna on the vehicle. The method comprises determining a presence of the object based on at least one characteristic of the received radar signal. The method comprises providing an indication to receive power from the wireless charger based at least in part on the determining the presence of the object.

Figure 1:
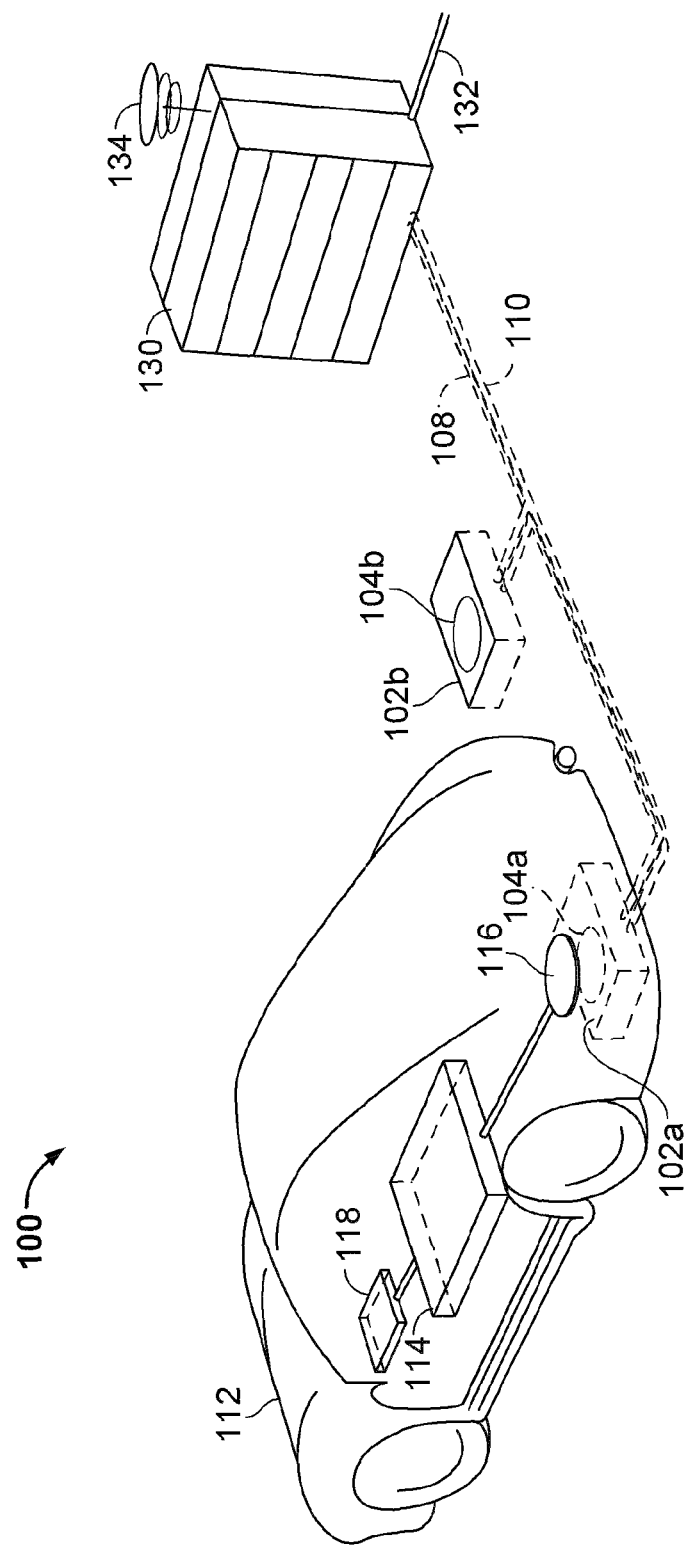
FIG. 1 is a diagram of an exemplary wireless power transfer system for charging an electric vehicle, in accordance with an exemplary implementation.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

The concepts disclosed herein are based on radar principles and techniques, and may be used for detecting either or both of metallic and non-metallic foreign objects in a predetermined 3-dimensional space. The basic principles and techniques primarily apply to the use of electromagnetic waves, e.g., microwaves. However, such principles and techniques may also apply to the use of acoustic, e.g. ultrasonic, waves with some modifications and limitations. For the sake of simplicity all descriptions refer to the use of microwaves at frequencies typically above 1 GHz. For example, in some implementations, useful frequency ranges may be 1-10 GHz, 12-27 GHz, and/or 77-81 GHz, e.g. the automotive bands. However, the present application is not so limited and frequencies of electromagnetic waves or radiation greater than, between or below the above-mentioned values are additionally contemplated.

Basic radar methods disclosed herein in general assume an Ultra-Wide-Band (UWB) technology transmitting pseudo-random sequences but they should not be construed as limited to that. They may be implemented with any of a wideband technology for providing sufficient resolution in time domain such as techniques based on transmitting pulses, FMCW, pseudo-noise waveforms (FSK, PSK), multi-tone signals. Some may even work with a narrow-band technology for providing sufficient resolution in frequency (Doppler) domain such as transmitting a simple CW signal.

The principles and techniques disclosed herein assume at least one radar transmitter, e.g. a radar transmit antenna, and at least one radar receiver, e.g. a radar receive antenna. However, such principles and techniques should not be construed as limited thusly. For example, such principles and techniques may utilize at least one passive radar signal transponder, active radar signal transponder, or signal repeater that may modify a retransmitted signal, e.g. by modulating the signal, by delaying the signal, or by frequency shifting the signal.

Radar-based foreign object detection (FOD) methods and implementations disclosed herein are conceived to be fully integrated into an IPT charging system and preferably into a base subsystem and specifically into the base IPT coupler, i.e., base pad. However, the methods disclosed herein may also apply to non-integrated stand-alone, i.e. discrete, solutions. FOD integration concepts and solutions disclosed herein assume integration into a base IPT coupler. They may also apply to vehicle coupler integration.

The methods and implementations disclosed herein assume both transmit and receive antennas integrated into the base unit. However, such methods and implementations should not be construed as limited thusly. Methods that are based on measuring a path attenuation, sometimes referred to as "s21," may use radar transmit antennas base-side and radar receive antennas vehicle-side, or vice versa.

Methods that use passive radar signal transponders or active radar signal transponders may use primary transmit and receive antennas base-side and transponders vehicle-side, or vice versa.

Though not specifically addressed herein, the FOD system is assumed connected to the wireless charging control system so that if presence of a foreign object is determined, power transfer (charging) may be either ceased or continued at a lower power level.

The IPT couplers assumed herein for the purpose of disclosing FOD integration concepts and solutions should be construed as exemplary and not limiting. Such exemplary IPT couplers are assumed to be composed of a coil structure, for example made with a Copper Litz wire, a ferrite structure, for example comprising a soft ferrite material, and a conductive back plate, for example comprising Aluminum. Two major types of IPT couplers are considered herein: a "Circular"-type coupler and a "Double-coil" or "Double D"-type coupler. Though not explicitly shown in this disclosure, a radar-based FOD may be integrated in other type of IPT couplers, for example into a "Bipolar"-type or a "Solenoid-type coupler with some modification.

In addition, descriptions and drawings show a single foreign object for the sake of simplicity. However, methods and apparatuses disclosed herein have the potential, in general, to detect an abnormal state due to more than one object within a predetermined space. Such an object may be a non-living object, such as debris and garbage including but not limited to a cigarette packet, a coke can, or a yoghurt cup, but also a living object, such as an extremity of human or an animal including but not limited to a cat, a dog, or a guinea pig.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary implementation. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some implementations, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary implementations, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some implementations the electric vehicle induction coil 116 may be aligned with the base system induction coil 104a and, therefore, disposed within a near-field region simply by the driver positioning the electric vehicle 112 correctly relative to the base system induction coil 104a. In other implementations, the driver may be given visual feedback, auditory feedback, or combinations thereof to determine when the electric vehicle 112 is properly placed on the "sweet" spot for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other implementations, the electric vehicle induction coil 116, the base system induction coil 104a, or a combination thereof may have functionality for displacing and moving the induction coils 116 and 104a relative to each other to more accurately orient them and develop more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a, e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
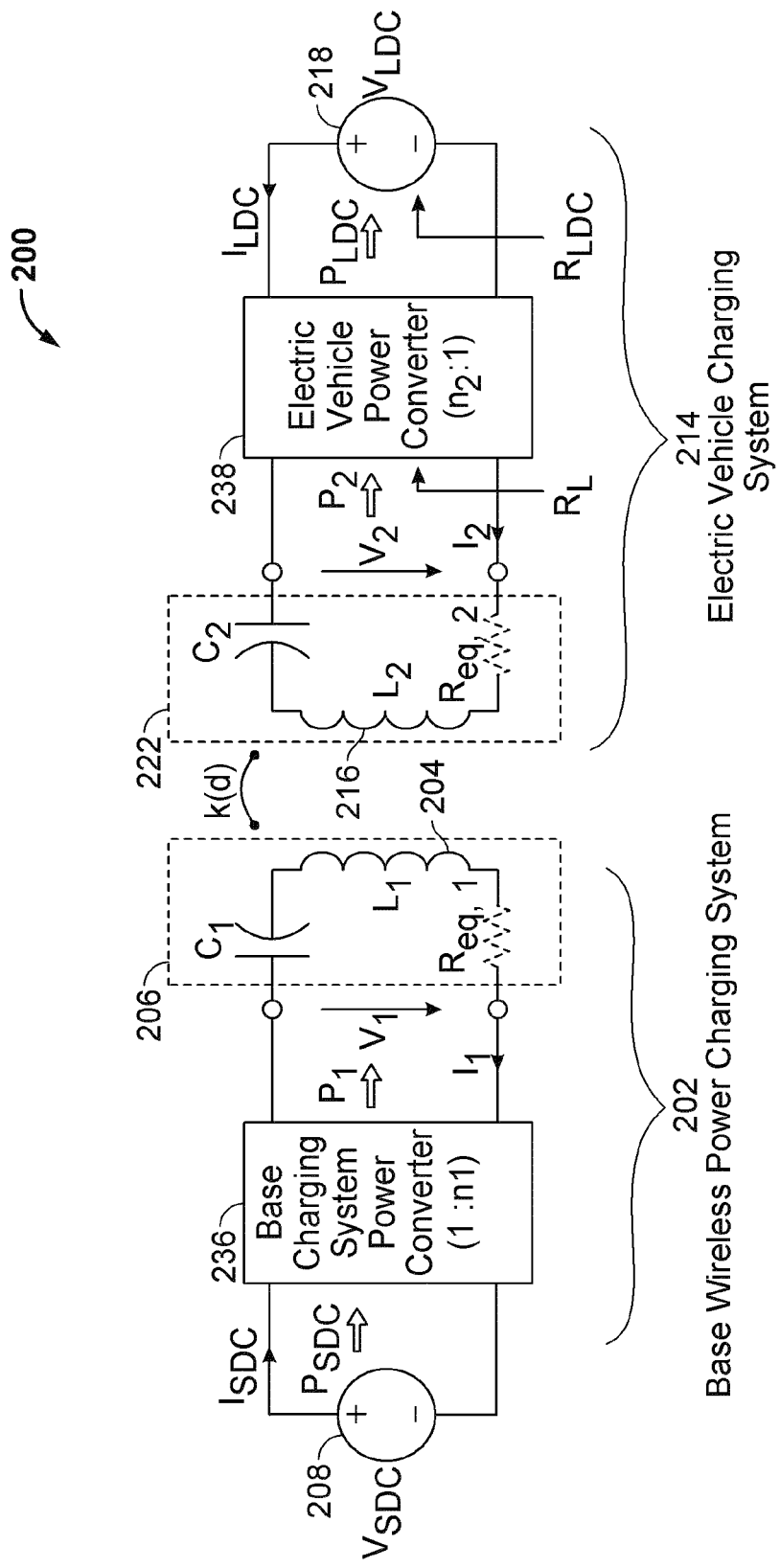
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Implementations described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be coupled with the base system induction coil 204 either in parallel or in series, or may be formed of several reactive elements in any combination of parallel or series topology. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. The capacitor $C_2$ may be coupled with the electric vehicle induction coil 204 either in parallel or in series, or may be formed of several reactive elements in any combination of parallel or series topology. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some implementations, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed implementations may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some implementations, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some implementations, electromagnetic induction coils, such as single and multi-turn loop antennas, are used for both transmitting and receiving since magnetic near field amplitudes in practical implementations tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
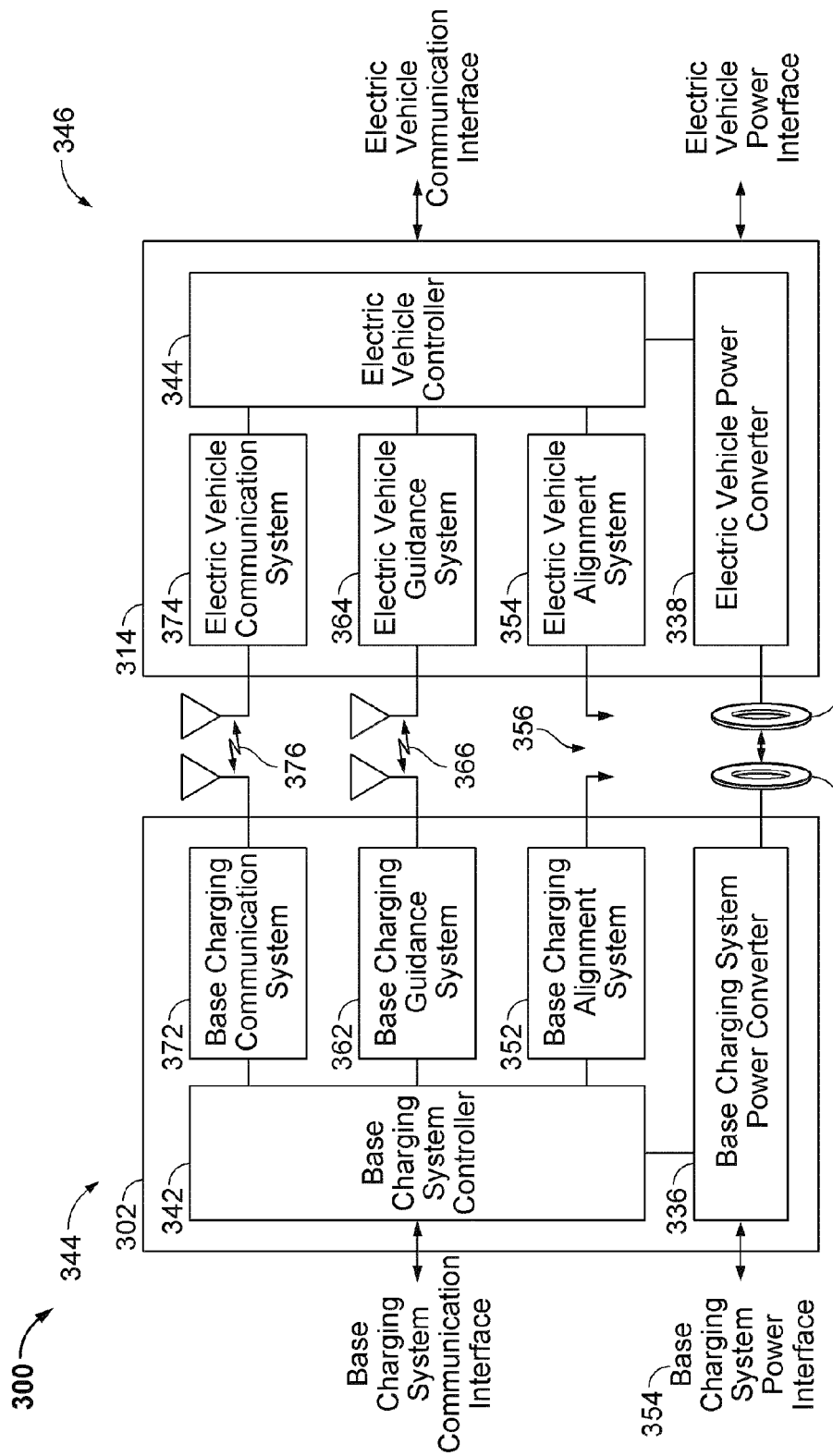
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking "park by wire" that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), and detection of hazardous events such as incandescent objects on the base system induction coil 304.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some implementations of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some implementations may be configured to transfer power at a frequency in the range from 10-150 kHz. This low frequency coupling may allow highly efficient power conversion that may be achieved using solid state devices. In addition, there may be less coexistence issues with radio systems compared to other bands.

With respect to induction charging, depending on the energy transfer rate (power level), operating frequency, size and design of the primary and secondary magnetic structures and the distance between them, the flux density in the air gap at some locations may exceed 0.5 mT and may reach several Millitesla. If an object that includes a certain amount of well conductive material (e.g., metal) is inserted into the space between the primary and secondary structures, eddy currents are generated in this object (Lenz"s law), that may lead to power dissipation and subsequent heating effects. This induction heating effect depends on the magnetic flux density, the frequency of the alternating magnetic field, the size, shape, orientation and conductivity of the object's conducting structure. When the object is exposed to the magnetic field for a sufficiently long time, it may heat up to temperatures that may be considered hazardous in several regards. One hazard may be self-ignition if the object includes flammable materials or if it is in direct contact with such materials, e.g., a cigarette package including a thin metalized foil. Another hazard may be burning the hand of a person that may pick up such a hot object, e.g., a coin or a key. Another hazard may be damaging the plastic enclosure of the primary or secondary structure, e.g., an object melting into the plastic.

A temperature increase may be also expected in objects including ferromagnetic materials that may be substantially non-conducting but exhibiting a pronounced hysteresis effect or in materials that generate both hysteresis and eddy current losses. As such, detecting such objects is beneficial to avoid corresponding harmful consequences. If the object detection system is integrated within a system for providing wireless power, in response to detecting a harmful object, the system may reduce a power level or shut down until measures may be taken to remove the harmful object.

In certain applications of inductive power transfer such as charging of electric vehicles in domestic and public zones, it may be compulsory for reasons of safety of persons and equipment to be able to detect foreign objects that have the potential to heat up to critical temperatures. This may be particularly true in systems where the critical space is open and accessible such that foreign objects may get accidentally or may be put intentionally into this space (e.g., in case of sabotage).

Implementations described herein are directed to automatically detecting hazardous foreign objects that may be located in a pre-defined space. Moreover, the use of microwaves for detecting foreign objects in a predetermined 3-dimensional space has several advantages. As opposed to optical and infrared methods, microwave sensors can be mounted behind a plastic enclosure e.g. behind the enclosure of a base pad so that they are protected from water, pollution, and mechanical impact. Therefore, such microwave sensors may not need special measures for mechanical protection and automatic cleaning. This may be also true for inductive sensing methods. However, inductive sensing typically at frequencies in the lower MHz frequency range may be considered generally more susceptible to interference from electromagnetic fields as generated by the IPT as opposed to methods using frequencies in the GHz range. Moreover, sensitivity of microwave sensing is considered more uniform if compared to pure inductive methods whose sensitivity rapidly decreases with distance from the sense loops. Although radar-based methods may be unable to differentiate between metallic and non-metallic objects, they have the potential for detecting both non-living and living objects.

Figure 4:
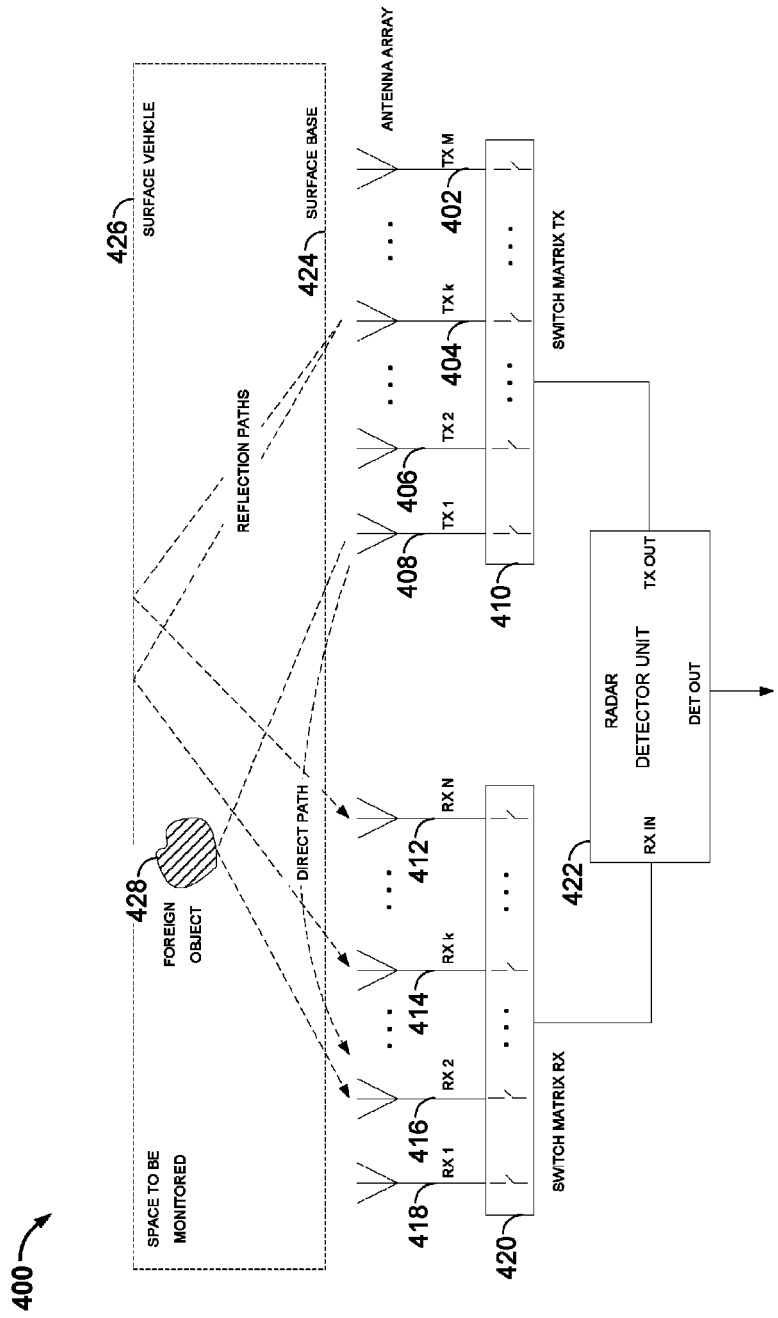
FIG. 4 is a schematic view of an exemplary radar system having multiple selectable transmit antennas and separate multiple selectable receive antennas for detecting foreign objects, in accordance with an exemplary implementation.

FIG. 4 is a schematic view 400 of an exemplary radar system having multiple selectable transmit antennas and separate multiple selectable receive antennas for detecting foreign objects, in accordance with an exemplary implementation. Such a system may be considered a transmission-type (s21) radar detection system. The system may comprise a radar detector unit 422 with separate microwave ports for transmitting (e.g. TX OUT) and receiving (e.g. RX IN). The system may additionally include a plurality of radar transmit antennas 402, 404, 406 and 408 (collectively transmit antennas 402-408) each selectable to be connected to the transmitting port of the radar detector unit 422 via a switching matrix 410. Likewise the system may additionally include a plurality of radar receive antennas 412, 414, 416 and 418 (collectively receive antennas 412-418) each selectable to be connected to the receiving port of the radar detector unit 422 via a switching matrix 420. In one exemplary implementation, only one transmit antenna and one receive antenna may be connected to the radar detector unit 422 at a time. The radar transmit antennas 402-408 may be mounted below a surface of the base pad 424 and at locations well spatially separated from one another. In the absence of an object, for example where there is no vehicle and no foreign object present, a signal transmitted by any of the radar transmit antennas 402-408 may be received by any of the radar receive antennas 412-418 only via a direct path as indicated in FIG. 4. In the presence of a vehicle, the transmitted signal may also be received via reflection off of a surface of the vehicle 426, e.g. the vehicle pad or the vehicle's underbody. The presence of a foreign object may add one or more reflection paths for a transmitted signal and may also shadow or partially shadow the direct path and/or any of the vehicle reflection paths. Accordingly, the appearance of additional propagation paths and/or changes to existing propagation paths may indicate the presence of a foreign object.

Figure 5:
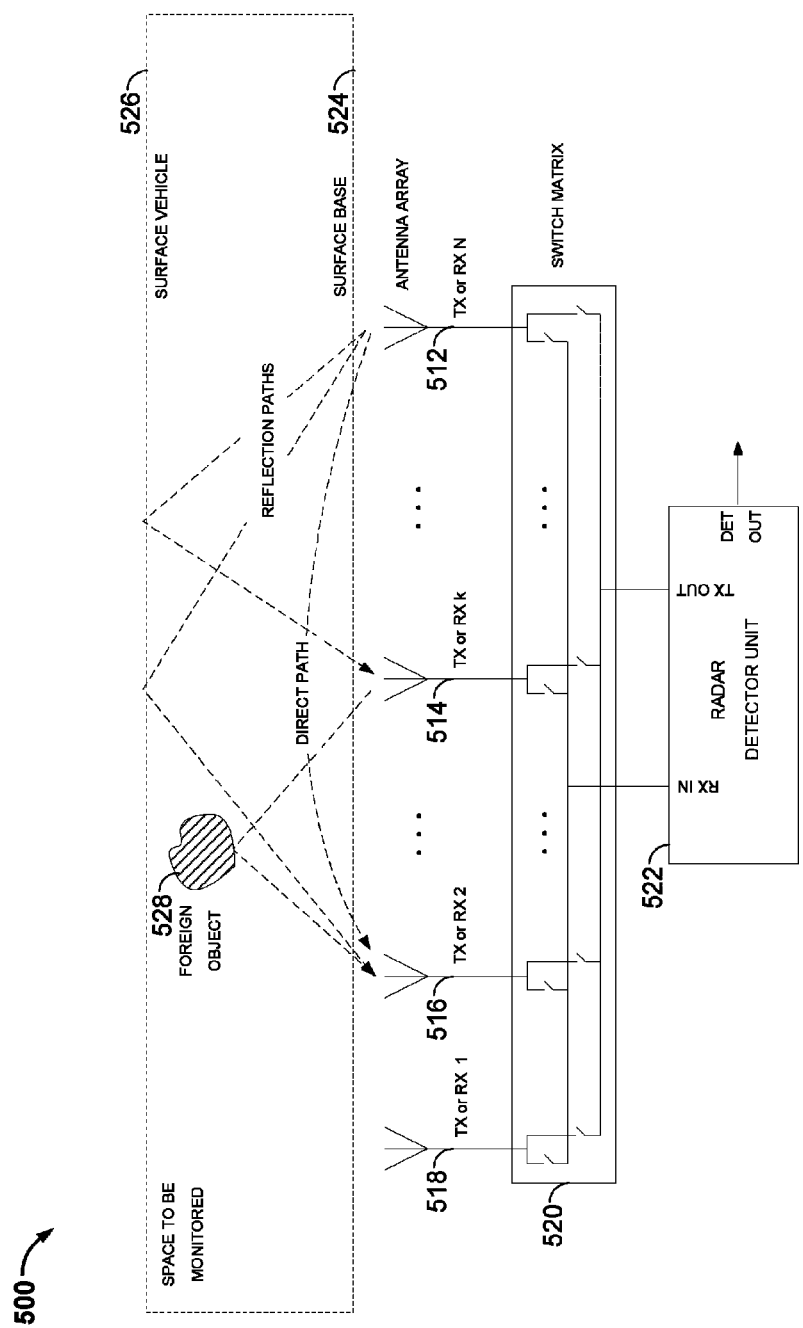
FIG. 5 is a schematic view of another exemplary radar system having multiple selectable antennas configurable as either transmit or receive antennas for detecting foreign objects, in accordance with an exemplary implementation.

FIG. 5 is a schematic view 500 of another exemplary radar system having multiple selectable antennas configurable as either transmit or receive antennas for detecting foreign objects, in accordance with an exemplary implementation. This system variant may also be considered as a transmission-type (s21) radar detection system. This system may comprise a different radar antenna array setup and a different switch matrix setup than that previously described in connection with FIG. 4. The system may include a radar detector unit 522, a switch matrix 520 and a plurality of radar antennas 512, 514, 516 and 518 (collectively 512-518). Each of the plurality of radar antennas 512-518 may function as a radar transmit antenna or a radar receive antenna and each is selectable to be connected to either of the transmitting port or the receiving port of the radar detector unit 522. In some implementations, only two of the plurality of radar antennas 512-518 may be used at a time, a first radar antenna for transmitting a radar signal and a second antenna for receiving the radar signal. As shown, a radar signal transmitted from an antenna configured as a radar transmit antenna (e.g. radar antenna 512) may be received by another antenna configured as a radar receive antenna (e.g. radar antenna 516) via one or both of a direct path and one or more reflection paths between a base pad surface 524 and a vehicle surface 526. When one of the radar antennas 512-518 is connected to the transmitting port of the radar detector unit 522 via the switching matrix 520, it may be configured as a radar transmit antenna. Likewise, when one of the radar antennas 512-518 is connected to the receiving port of the radar detector unit 522 via the switching matrix 520, it may be configured as a radar receive antenna.

Figure 6:
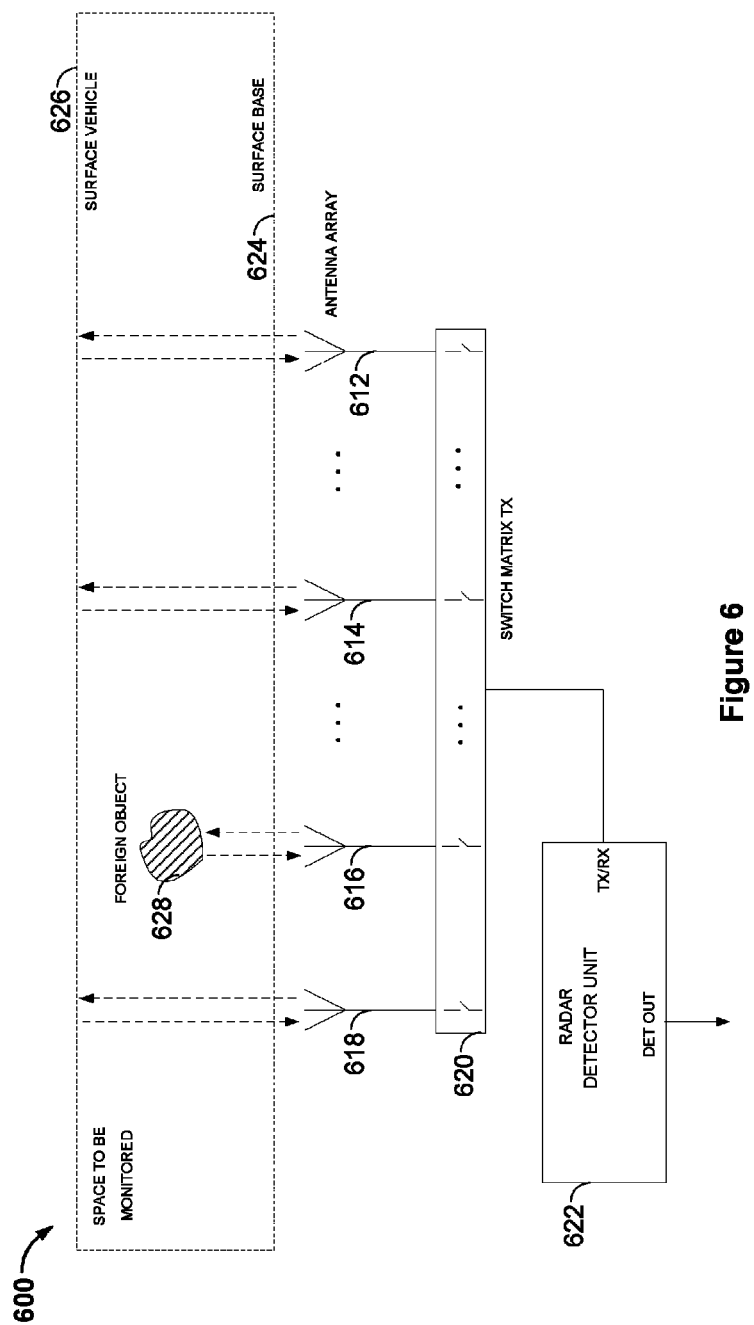
FIG. 6 is a schematic view of another radar system having multiple selectable antennas configurable to both send and receive radar signals for detecting foreign objects, in accordance with an exemplary implementation.

FIG. 6 is a schematic view 600 of another radar system having multiple selectable antennas configurable to both send and receive radar signals for detecting foreign objects, in accordance with an exemplary implementation. Such a system may also be known as a reflection-type (s11) radar system. The system may comprise a radar detector unit 622 having only a single microwave port for both transmitting and receiving radar signals, a switch matrix 620 and a plurality of radar antennas 612, 614, 616 and 618 (collectively 612-618). In some implementations, each radar antenna 612-618 may by selectable to be connected to the single microwave port via the switch matrix 620. In such implementations, only one of the radar antennas 612-618 may be connected to the single microwave port at a time. Radar signals transmitted by the connected radar antenna are also received by the same radar antenna. Thus, each of the radar antennas 612-618 may be configured as a radar transmit antenna at a first time when a radar signal is transmitted, and may then be configured as a radar receive antenna at a second time when the transmitted radar signal is received at the antenna, after having been reflected by either a foreign object 628 or a surface of a vehicle 626.

Although not shown, in some implementations of the system shown in FIG. 6, a system based on a s11-type radar may comprise a dedicated radar detector unit for each antenna element. In such implementations there may be no need for switches and there may be virtually no antenna feeder lines. In such a case, the radar detector units may be located close to the antenna elements. The number of radar detector units operating at a time may be one or more depending on the signal-to-interference ratio that the system can reliably operate under.

Figure 7:
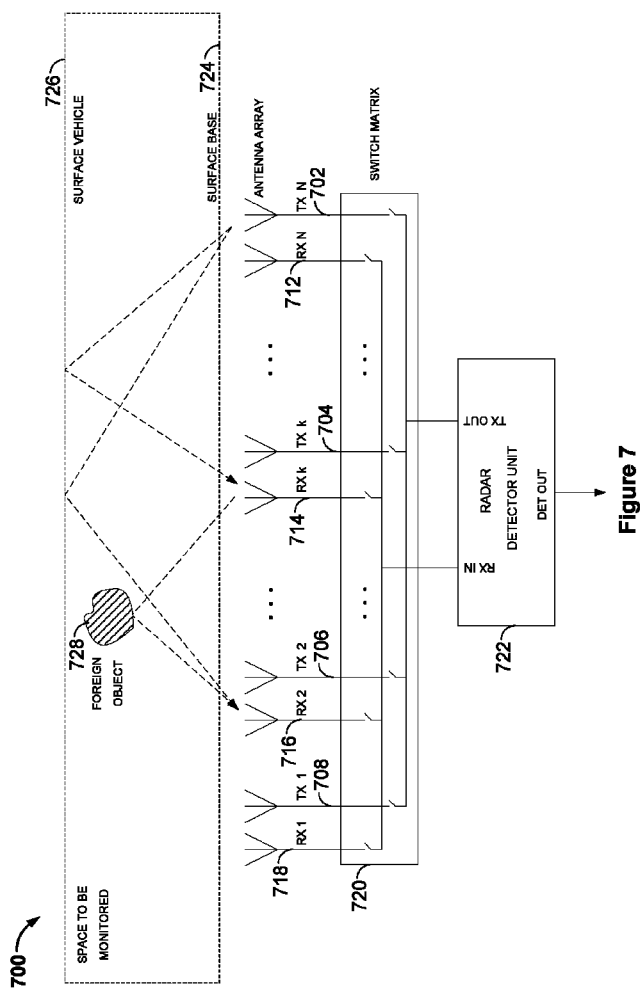
FIG. 7 is a schematic view of another radar system having multiple selectable transmit antennas and separate multiple selectable receive antennas in collocated pairs for detecting foreign objects, in accordance with an exemplary implementation.

FIG. 7 is a schematic view 700 of another radar system having multiple selectable transmit antennas and separate multiple selectable receive antennas in collocated pairs for detecting foreign objects, in accordance with an exemplary implementation. For example, the system may comprise a plurality of pairs of collocated radar transmit antennas 702, 704, 706 and 708 (collectively 702-708) and radar receive antennas 712, 714, 716 and 718 (collectively 712-718), a switch matrix 720 and a radar detector unit 722 having a microwave transmitting port and a microwave receiving port. Although a pair of radar transmit and receive antennas may be collocated, a signal may not necessarily be transmitted from the radar transmit antenna and received by the collocated radar receive antenna. For example, as shown, a radar signal may be transmitted by the radar transmit antenna 702, reflected by one or both of a foreign object 728 and a surface of a vehicle 726, and received by the radar receive antenna 714 and/or the radar receive antenna 716, while another radar signal may be transmitted by the radar transmit antenna 704 and similarly be received by the radar receive antenna 716. This system can provide the highest flexibility in configuring array elements either to transmit or receive antennas among the systems of FIGS. 4-7.

Figure 8:
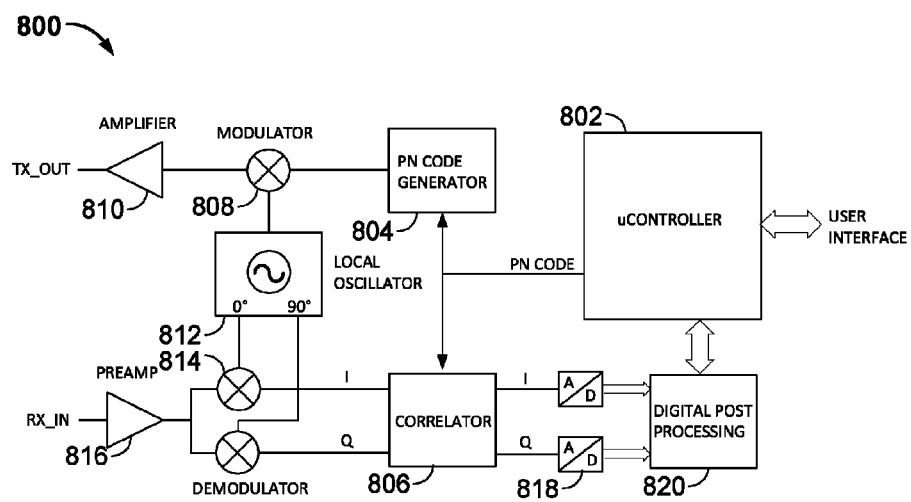
FIG. 8 is block diagram of a radar detector unit having separate ports for transmitting and receiving, in accordance with an exemplary implementation.

FIG. 8 is block diagram 800 of a radar detector unit having separate ports for transmitting and receiving, in accordance with an exemplary implementation. The radar detector unit may be the radar detector unit 422, 522, 722 of any of FIG. 4, 5, or 7, for example. The radar detector unit may comprise a microcontroller 802 for determining a pseudo-random sequence comprising a pseudo-noise (PN) code and may be configured to communicate this PN code to both a transmit branch and a receive branch of the radar detector unit. The transmit branch may comprise a PN code generator 804 connected to a modulator 808, which receives a common local oscillator signal from a local oscillator 812 and which communicates a modulated PN code to an amplifier 810. An output of the amplifier 810 may be connected to the transmitting port of the radar detector unit.

The receive branch may comprise a preamplifier 816 configured to receive radar signals from the receiving port of the radar detector unit and output an amplified received radar signal to a demodulator 814 which may be also called a down-converter or a quadrature mixer and which may receive in-phase and quadrature-phase (0° and) 90° common local oscillator signals from the local oscillator 812 and output in-phase and quadrature-phase demodulated radar signals (I and Q) to a correlator 806, which may receive the PN code from the controller 802. Both the transmit branch and the receive branch may utilize a common local oscillator signal to guarantee phase synchronous correlation of the received signals. The correlator 806 may be configured to communicate the correlated in-phase and quadrature-phase demodulated radar signals (I and Q) to a respective analog-to-digital converter (A/D) 818. Each A/D 818 may be connected to a digital post processor 820, which may be in communication with the microcontroller 802. At its user interface, the radar detector unit may provide a complex (in-phase and quadrature component) radar response of the channel between the transmitting port and the receiving port.

Figure 9:
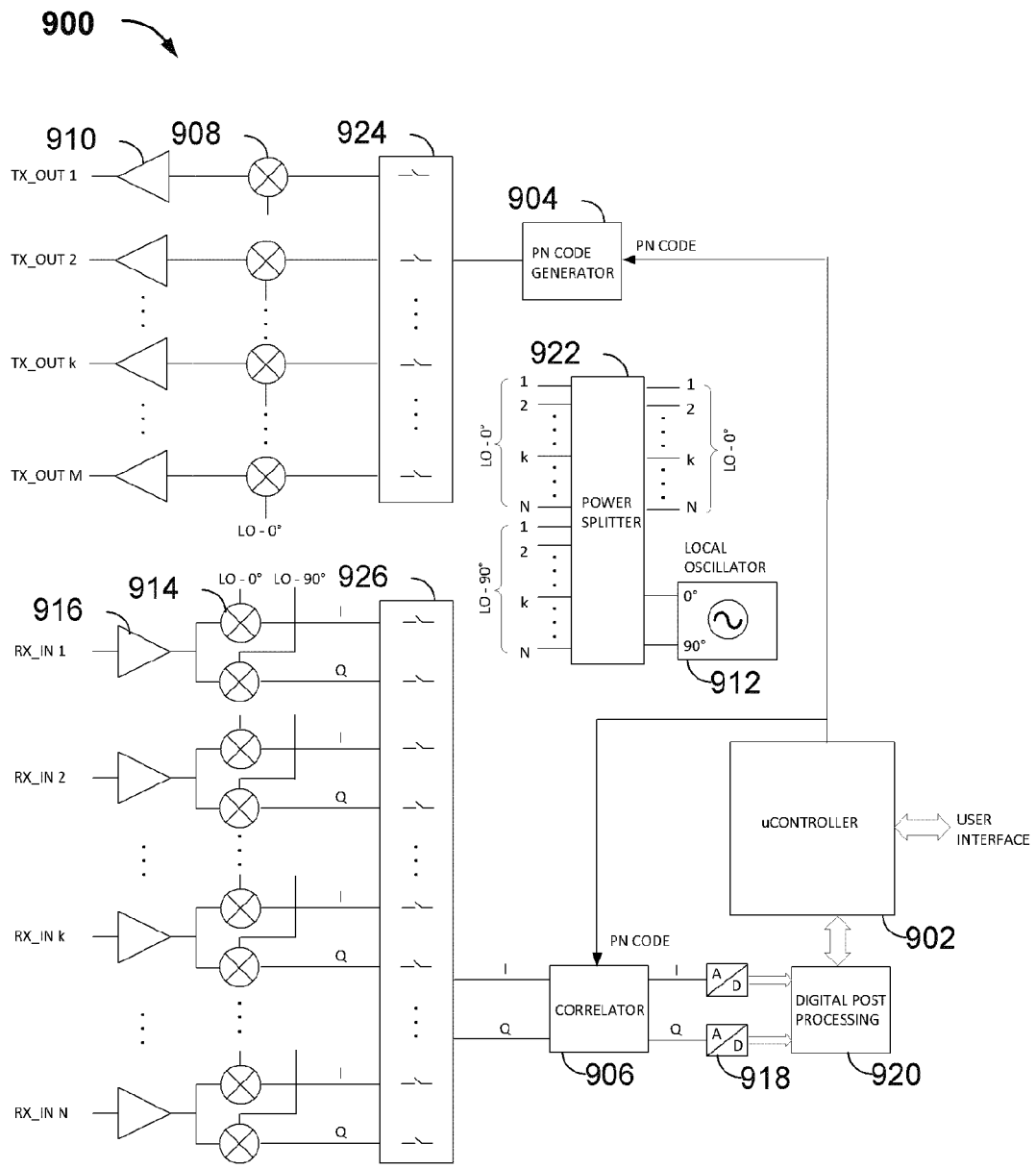
FIG. 9 is a block diagram of a radar detector unit having multiple transmitting ports and multiple receiving ports, in accordance with an exemplary implementation.

To reduce insertion losses in the microwave path, antenna selection may be performed after demodulation at base band resulting in a multiple transmit and multiple receive port radar detector unit, as shown in FIG. 9. FIG. 9 is a block diagram 900 of a radar detector unit having multiple transmitting ports and multiple receiving ports, in accordance with an exemplary implementation. The operation of the radar detector unit of FIG. 9 may be substantially the same as that previously described in connection with the two port radar detector unit of FIG. 8 with a few exceptions as described below. Thus, each of the microcontroller 902, PN code generator 904, correlator 906, A/D converters 918, digital post processor 920 and local oscillator 912 may operate substantially the same as described above with respect to each of the microcontroller 802, PN code generator 804, correlator 806, A/D converters 818, digital post processor 820 and local oscillator 812 of FIG. 8. However, the radar detector unit of FIG. 9 includes N transmit paths and N receive paths, rather than one of each as in FIG. 8. Thus, within the transmit paths, the radar detector unit of FIG. 9 may comprise N modulators 908 in parallel, each configured to be connected to the PN code generator 904 via a switch matrix 924. The radar detector unit of FIG. 9 additionally includes N amplifiers 910, each receiving an input from a respective one of the N modulators 908. Likewise, within the N receive paths, the radar detector unit of FIG. 9 may comprise N preamplifiers 912 in parallel, each configured to receive a signal from a respective receiving port of the radar detector unit, and configured to output an amplified received radar signal to a respective one of N demodulators 914. An in-phase and quadrature-phase output of each of the N demodulators 926 may be configured to be connected to the correlator 906 via a switch matrix 926.

The common local oscillator 912 for all N modulators 908 and N demodulators 914 is configured to generate a 0° and 90° local oscillator signal, which is distributed to each of the N modulators 908 and the N demodulators 914 via respective outputs of a power splitter 922, which has in-phase and quadrature inputs connected to the local oscillator 912.

Using different PN-sequences with a length providing sufficient processing gain may allow use of multiple independent radar detector units operating at the same time. Thus multiple radar channels may be monitored simultaneously increasing the number of radar responses that can be acquired per unit time.

Figure 10:
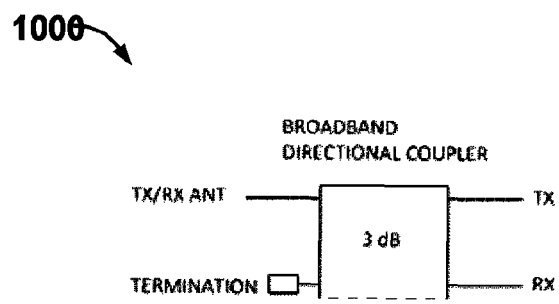
FIG. 10 shows a directional coupler for converting a two port radar detector unit to a single port radar detector unit, in accordance with an exemplary implementation.
Figure 11:
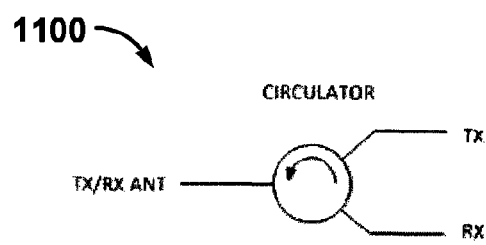
FIG. 11 shows a circulator for converting a two port radar detector unit to a single port radar detector unit, in accordance with an exemplary implementation.

The two-port radar detector unit of FIG. 8, or alternatively the 2N-port radar detector unit of FIG. 9, may be configured as a single-port unit by utilizing one or N directional couplers or one or N circulators, respectively, as will be describe in connection with FIGS. 10 and 11, respectively.

FIG. 10 shows a directional coupler 1000 for converting a two port radar detector unit to a single port radar detector unit, in accordance with an exemplary implementation. The directional coupler 1000 may be a conventional directional coupler having a termination terminal, a transmit terminal, a receive terminal, and a composite transmit/receive terminal. The directional coupler 1000 may have a coupling of approximately 3 dB, which corresponds to an insertion loss of approximately 3 dB. By connecting the transmit and receive ports of the two port radar detector unit 822 of FIG. 8, or a corresponding one of the N transmit and receive ports of the 2N port radar detector unit 922 of FIG. 9, to the transmit and receive ports of the directional coupler 1000, respectively, the two-port radar detector unit 822 of FIG. 8, or one of the N transmit and receive ports of the 2N port radar detector unit 922 of FIG. 9, may be converted to one or N single port radar detector units, respectively, as shown in FIG. 6 for example.

FIG. 11 shows a circulator 1100 for converting a two port radar detector unit to a single port radar detector unit, in accordance with an exemplary implementation. The circulator 1100 may comprise a transmit port, a receive port, and a composite transmit/receive port. A RF or microwave signal entering any port of the circulator 1100 is transmitted to the next port only in a rotation direction defined by the arrow. For example, a signal input to the transmit port will be transmitted to the composite transmit/receive port and not the receive port, and a signal input to the composite transmit/receive port will be transmitted to the receive port and not the transmit port. In this way, by connecting the transmit and receive ports of the two port radar detector unit 822 of FIG. 8 to the transmit and receive ports, respectively, of the circulator 1100 of FIG. 11, the two-port radar detector unit 822 of FIG. 8 may be converted to a single port radar detector unit, as shown in FIG. 6 for example.

Figure 12:
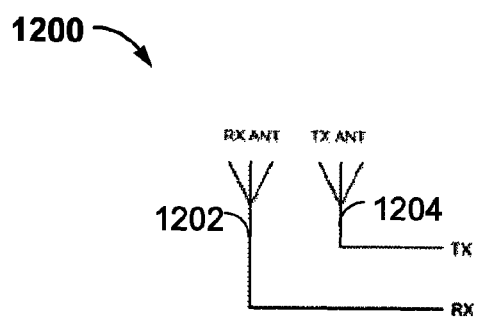
FIG. 12 shows a collocated pair of transmit antenna and a receive antenna for forming a virtual single port radar detector unit from a two port radar detector unit, in accordance with an exemplary implementation.

FIG. 12 shows a collocated pair of transmit antenna and a receive antenna for forming a virtual single port radar detector unit from a two port radar detector unit, in accordance with an exemplary implementation. The collocated pair 1200 may comprise a receive antenna 1202 and a transmit antenna 1204 having some minimum spatial separation.

FIGS. 13, 14, 17, 18, 21, 22, 25 and 26 illustrate different variants of antenna arrangements and integration concepts in accordance with some exemplary implementations. FIGS. 15, 16, 19, 20, 23, 24, 27 and 28 illustrate variants of the printed circuit boards (PCBs, also known as printed wire boards PWBs) associated with FIGS. 13, 14, 17, 18, 21, 22, 25 and 26, respectively. These variants may result from space constraints such as given by the different host IPT coupler types and/or by other design and optimization criteria. Each of the host IPT couplers are assumed to be composed of a coil structure disposed over a ferrite structure that is disposed over a conductive back plate as will be described in more detail below.

Figure 13:
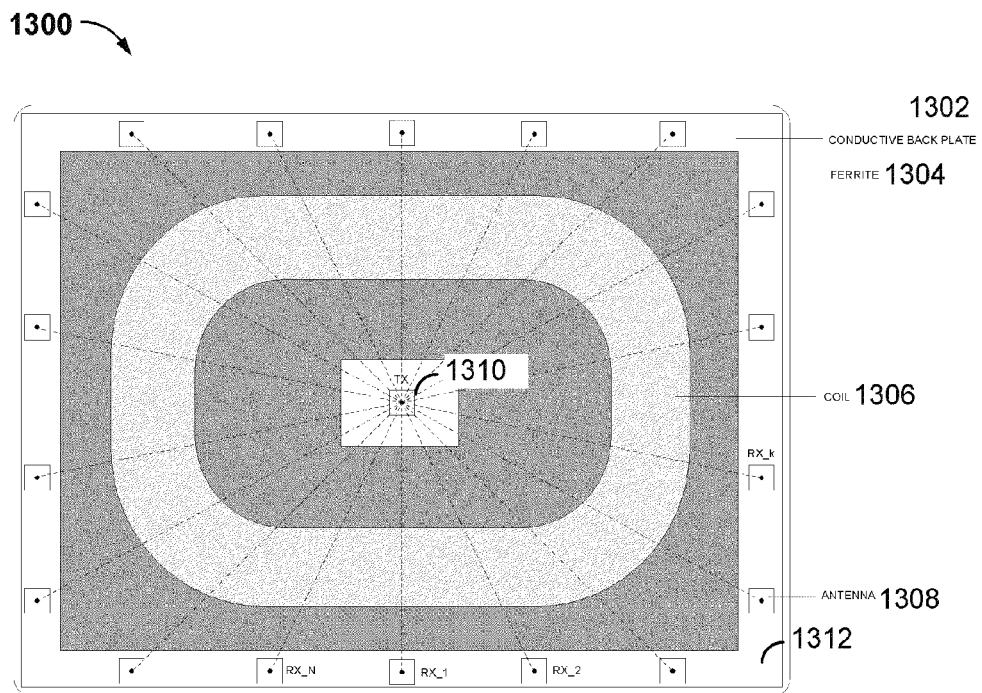
FIG. 13 shows an arrangement of a radar transmit antenna disposed at a center of a planar single coil IPT coupler ("Circular" pad) and a plurality of radar antennas disposed on a periphery of the pad, in accordance with an exemplary implementation.

FIG. 13 shows an arrangement 1300 of a radar transmit antenna disposed at a center of a planar single coil IPT coupler ("Circular" pad) and a plurality of radar antennas disposed on a periphery of the pad, in accordance with an exemplary implementation. The arrangement 1300 may correspond to a transmission-type (s21) radar system as previously described in connection with any of FIG. 4, 5, or 7. The arrangement 1300 may comprise a conductive back plate 1302, a ferrite layer 1304 disposed over the conductive back plate 1302 and a coil 1306 for transmitting wireless power disposed over the ferrite layer 1304. The arrangement 1300 may additionally include a PCB 1312 disposed between the conductive back plate 1302 and the ferrite layer 1304. The PCB 1312 may include a single radar transmit antenna 1310 located in the center of the PCB 1312, which may be positioned or disposed such that the transmit antenna 1310 is positioned where the magnetic flux density is relatively low and where a portion of the ferrite layer 1304 may have a reduced thickness or may be omitted without significant loss of performance. The PCB 1312 may additionally include a plurality of receive antennas 1308 disposed on a peripheral area, e.g. periphery, of the base pad and/or PCB 1312 to where the ferrite layer 1304 does not extend, but under which the conductive back plate 1302 does extend. The arrangement 1300 may provide a smallest variation in path length between the radar transmit antenna 1310 and each of the radar receive antennas 1308. The arrangement may additionally provide substantially complete coverage of the pad area as well as adequate sensitivity at all locations in the critical space.

Of note, a small foreign object may noticeably affect the transmission between the radar transmit antenna 1310 and any of the radar receive antennas 1308 only if the foreign object is located within a low order Fresnel zone (e.g. order n≤3) between the radar transmit antenna 1310 and one of the radar receive antennas 1308. For example, if the foreign object is too far offset in a perpendicular direction from a fictitious straight line (shown as dotted lines between the radar transmit antenna 1310 and each of the radar receive antennas 1308) that intersects the radar transmit antenna 1310 and one of the radar receive antennas 1308 any point, it may not be detectable by that radar receive antenna 1308. However, if the foreign object still lies within a low order Fresnel zone of the radar transmit antenna 1310 and a neighboring radar receive antenna 1308, the foreign object may still be detected by the neighboring radar receive antenna.

For the sake of a more complete understanding, a Fresnel zone is one of a theoretically infinite number of concentric ellipsoids which define volumes in the radiation pattern of an antenna. The cross section of the first, or innermost, Fresnel zone is circular, the radius of which at any point between the transmitting and receiving antenna may be determined according to the following equation:

$$Fn = \sqrt{\left(\frac{n\lambda d1 d2}{d1 + d2}\right)} \qquad \text{Eq. 1}$$

where $F_n$ is the $n^{th}$ Freznel zone radius in meters at any point p, $d_1$ is the distance of the point p to one end in meters, $d_2$ is the distance of the point p to the other end in meters, and $\lambda$ is the wavelength of the transmitted signal in meters. Thus, the area of greatest detectability will lie at a midpoint between the radar transmit antenna and a respective radar receive antenna.

An object placed in the center of the pad above the radar transmit antenna 1310 may affect all radar channels at all radar receive antennas 1308. For certain use cases and in some detection schemes, this may be considered disadvantageous as explained in further detail below. Thus, in some implementations (not shown), placing more than one radar transmit antenna (e.g. 4 radar transmit antennas) in the center of the base pad and/or PCB 1312 and assigning a different group of radar receive antennas to each of the radar transmit antenna may be advantageous.

Figure 14:
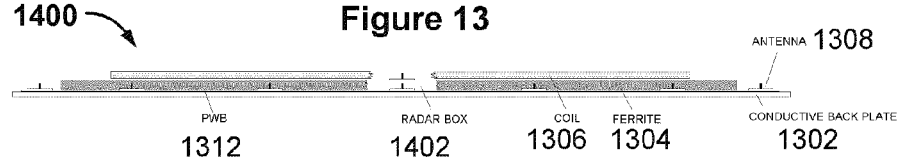
FIG. 14 shows a side view of the arrangement of radar antennas of FIG. 13.

FIG. 14 shows a side view 1400 of the arrangement 1300 of radar antennas of FIG. 13. As shown in FIG. 14, a radar detector unit (e.g. radar box) 1402 may be disposed substantially at the center and on the front side of the PCB 1312 in the portion of the ferrite layer 1304 that has a reduced or zero thickness. This may advantageously allow for more compact construction and reduced dimensions of the base pad assembly.

Figure 15:
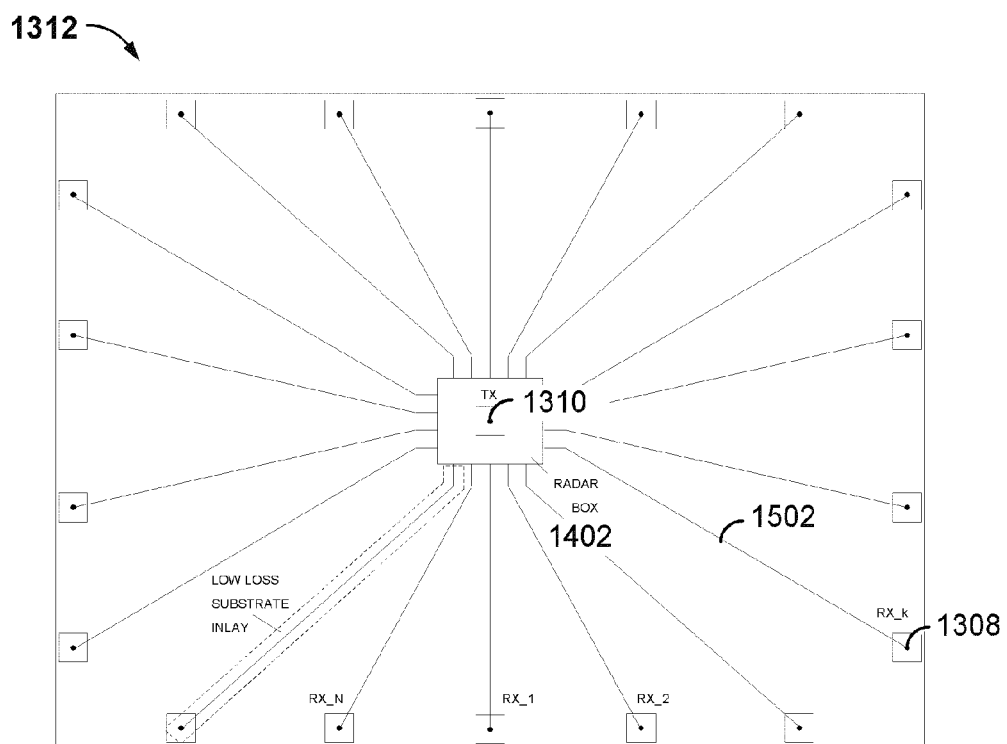
FIG. 15 shows a printed circuit board having the radar antenna arrangement shown in FIG. 13.

FIG. 15 shows a printed circuit 1500 board having the radar antenna arrangement shown in FIG. 13. The PCB 1312 may comprise the radar transmit antenna 1310 and the plurality of radar receive antennas 1308 in the arrangement(s) previously described in connection with FIG. 13.

The PCB 1312 may serve as a carrier for the antennas 1308/1310, a plurality of antenna feeder lines 1502, and the radar detector unit 1402. The radar detector unit 1402 may integrate all active circuitry such as the switches, the power distributors, the amplifiers, the modulators, the demodulators as well as the analog and digital processors, as previously described in connection with FIGS. 8-12.

The radar transmit/receive antennas 1308/1310 may be simple vertical quarter-wave monopole antennas exhibiting an omnidirectional azimuthal radiation pattern and a radiation minimum at 90° elevation angle. For the radar receive antennas 1310, some directivity towards the radar transmit antenna 1310 may be advantageous to enhance detection sensitivity. Antenna structures that can be printed on the PCB 1312, e.g. slot antennas, "Vivaldi" antennas, or Yagi-like multi-element antennas, may be also employed. Depending on the fractional bandwidth of the radar system, wideband antennas like conical or logarithmic-periodic multi-element antennas or fractal antennas may be used as well. If the radar solution requires antennas with more directivity a phased-array consisting of a plurality of antennas may be used. The phased-array may be printed on a PCB e.g. an array of patch antennas. For non-integrated (discrete) solutions, horn antennas, helix antennas or other structures such as Fresnel lenses may also apply.

Depending on the radar operating frequency, there may be special requirements for the substrate material of the PCB 1312 to minimize transmission losses. Alternatively, the PCB 1312 may be made of a standard glass fiber reinforced plastic, e.g. FR4, however, having locally embedded low loss substrate material for the feeder lines 1502. For the feeder lines 1502, any of the known microwave transmission line techniques such as strip line, microstrip line, coplanar line, slot line, etc. may apply. Strip lines that use a flat strip of metal sandwiched between a top and bottom ground plane may be considered particularly useful as the EM fields are not influenced by the materials that may be above and below the PCB 1312.

Figure 16:
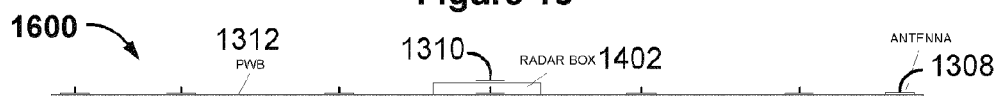
FIG. 16 shows a side view of the printed circuit board of FIG. 15.

FIG. 16 shows a side view 1600 of the printed circuit board 1312 of FIG. 15. As shown, the radar detector unit 1402 is disposed substantially at the center and on the front side of the PCB 1312 in the portion of the ferrite layer 1304 that has a reduced or zero thickness.

Figure 17:
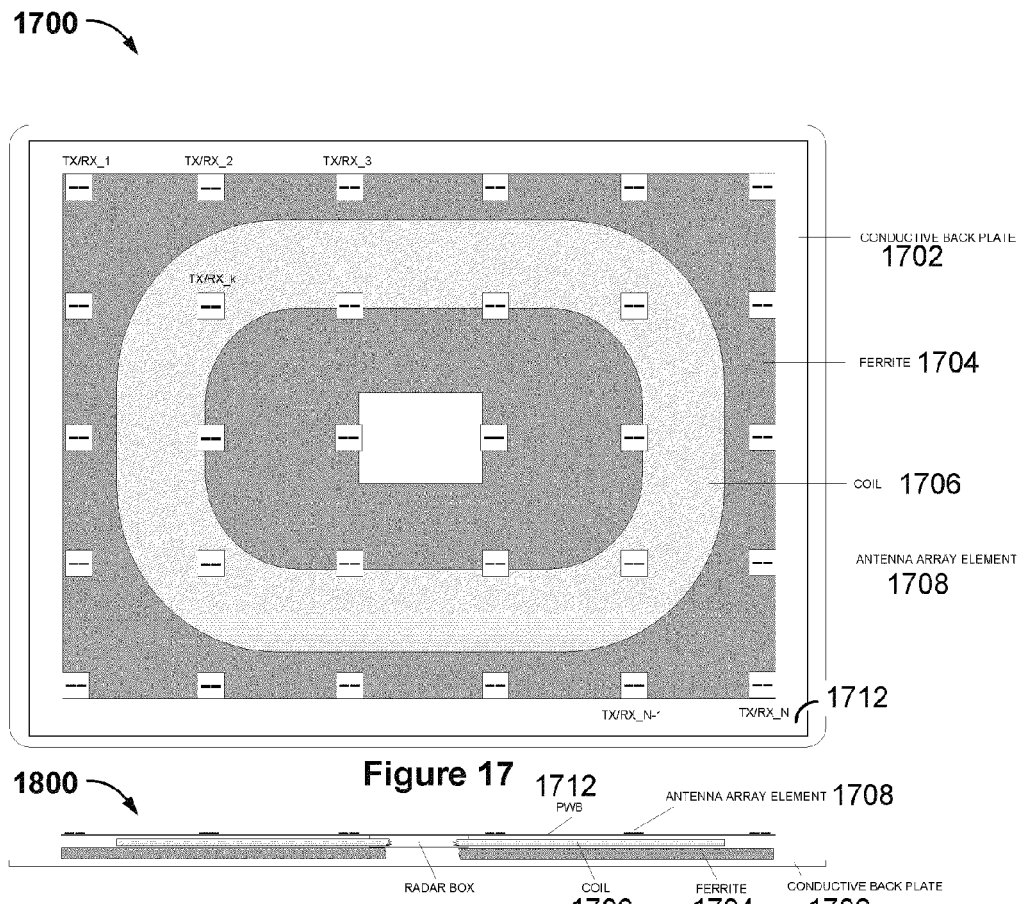
FIG. 17 shows an arrangement of paired transmit and receive radar antennas or single radar antennas for both transmitting and receiving disposed in an array over a planar single coil IPT coupler ("Circular" pad), in accordance with an exemplary implementation.

FIG. 17 shows an arrangement 1700 of paired transmit and receive radar antennas or single radar antennas for both transmitting and receiving disposed in an array over a planar single coil IPT coupler ("Circular" pad), in accordance with an exemplary implementation. As describe in FIG. 13, the arrangement 1700 may include a conductive back plate 1702, a ferrite layer 1704 disposed over the conductive back plate 1702, and a coil 1706 disposed over the ferrite layer 1706. The arrangement 1700 may additionally include a PCB 1712 disposed over the coil 1706. The PCB 1712 may include an array of radar antennas 1708. Each antenna 1708 of the array may comprise a either single antenna for both transmission and reception, as previously described in connection with FIG. 6, or alternatively a pair of antennas, a first antenna for transmitting and a second antenna for receiving, as previously described in connection with FIG. 7. The antennas 1708 may be placed in a regular pattern across the area of the IPT pad and/or PCB 1712. For a s21-type radar, antennas may be configured for shortest transmission paths, for example between pairs of neighboring elements in the array.

Figure 18:
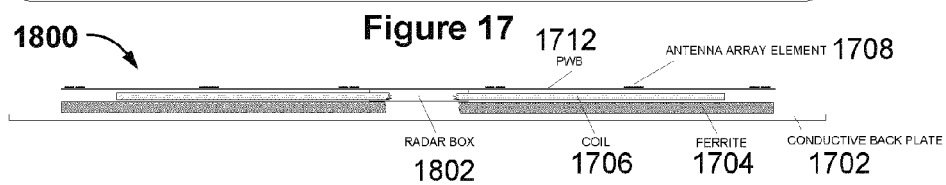
FIG. 18 shows a side view of the arrangement of radar antennas of FIG. 17.

FIG. 18 shows a side view 1800 of the arrangement 1700 of radar antennas of FIG. 17. As shown in FIG. 18, a radar detector unit 1802 may be disposed substantially at the center and on the back side of the PCB 1712 in the portion of the ferrite layer 1704 that has a reduced or zero thickness. This may advantageously allow for more compact construction and reduced dimensions of the base pad assembly.

Figure 19:
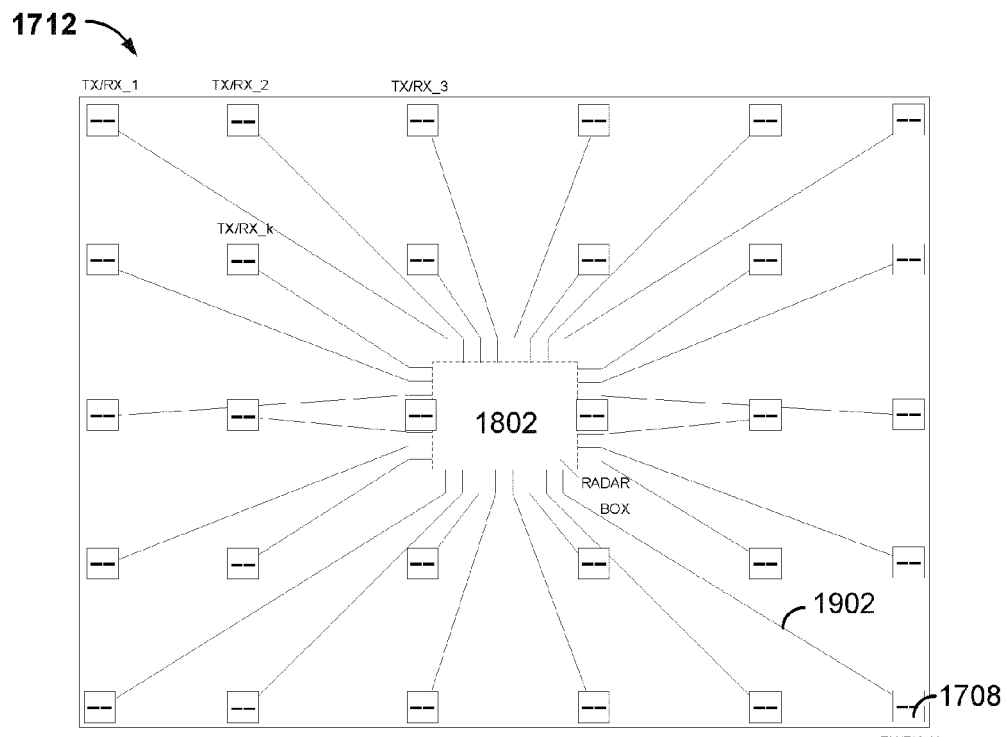
FIG. 19 shows a printed circuit board having the radar antenna arrangement shown in FIG. 17.

FIG. 19 shows the printed circuit board 1712 having the radar antenna arrangement shown in FIG. 17. The PCB 1712 comprises the array of radar antennas 1708 in the arrangement previously described in connection with FIG. 17. The PCB 1712 may serve as a carrier for the antennas 1708, a plurality of antenna feeder lines 1902, and the radar detector unit 1802. The radar detector unit 1802 may be mounted in the center of and on a backside of the PCB 1802 where magnetic flux density is relatively low and where ferrite may be omitted without significant loss of performance. The radar detector unit 1802 may integrate all active circuitry as previously described in connection with FIGS. 8-12.

The radar antennas 1708 may be printed on the PCB 1712. Examples of suitable antenna types may include half-wave dipoles, bi-triangles (2D Bi-conical) antennas, patch antennas, slot antennas or similar radiating structures with maximum gain at high elevation angles and sufficient bandwidth. Regarding construction, the PCB 1712 may be substantially the same as the PCB 1312 of FIG. 15. The PCB 1712 may further comprise locally embedded low loss substrate material for the feeder lines 1902, just as described in connection with FIG. 15.

Figure 20:
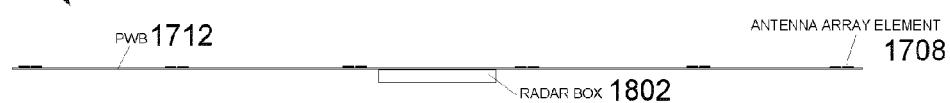
FIG. 20 shows a side view of the printed circuit board of FIG. 19.

FIG. 20 shows a side view 2000 of the printed circuit board 1712 of FIG. 19. As shown, the radar detector unit 1802 is disposed substantially at the center and on the back side of the PCB 1712.

Figure 21:
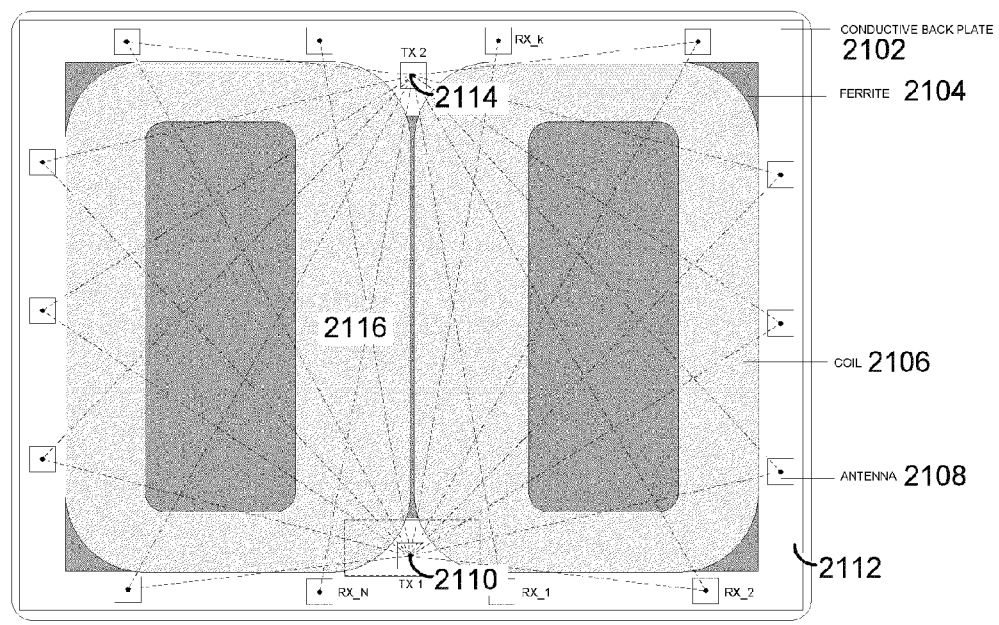
FIG. 21 shows an arrangement of radar transmit antennas disposed at a center of a planar double coil IPT coupler ("Double D" pad) and a plurality of radar antennas disposed on a periphery of the pad, in accordance with an exemplary implementation.

FIG. 21 shows an arrangement 2100 of radar transmit antennas disposed at a center of a planar double coil IPT coupler ("Double D" pad) and a plurality of radar antennas disposed on a periphery of the pad, in accordance with an exemplary implementation. The arrangement 2100 may be suitable for a transmission-type (s21) radar system, as described in connection with any of FIG. 4, 5 or 7. The arrangement 2100 may comprise a conductive back plate 2102, a ferrite layer 2104 disposed over the conductive back plate 2102, a first coil 2106 and a second coil 2114 for transmitting wireless power disposed over the ferrite layer 2104. The arrangement 2100 may additionally include a PCB 2112 disposed between the conductive back plate 2102 and the ferrite layer 2104. The PCB 2112 may include a first radar transmit antenna 2110 and a second radar transmit antenna 2114 disposed in two unused spaces near and over the rounded corners of the first coil 2106 and the second coil 2116. Thus, the first and second radar transmit antennas 2110/2114 may be located substantially in a center portion of the PCB 2112. At these locations magnetic flux density is relative low and portions of the ferrite layer 2104 may be cut out without significant performance loss. This antenna arrangement and configuration may provide good coverage of the pad area and enough sensitivity at all locations in the critical space. Alternatively, the first and second radar transmit antennas 2110/2114 may be disposed at a position on the PCB 2112 coinciding with the center of the first and second coils 2106/2114 (not shown), similar to that shown in FIG. 13. The PCB 2112 may additionally include a plurality of receive antennas 2108 disposed on a peripheral area, e.g. periphery, of the base pad and/or PCB 2112 where the ferrite layer 2104 does not extend, but under which the conductive back plate 2102 does extend.

Figure 22:
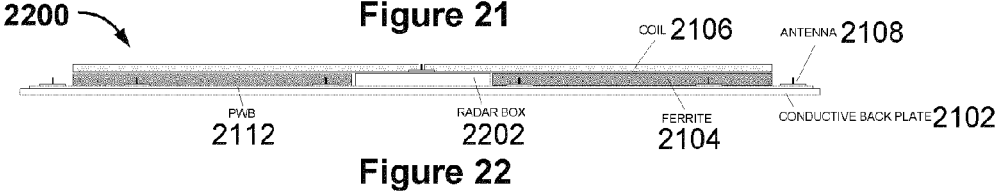
FIG. 22 shows a side view of the arrangement of radar antennas of FIG. 21.

FIG. 22 shows a side view 2200 of the arrangement 2100 of radar antennas of FIG. 21. As shown in FIG. 22, a radar detector unit 2202 may be disposed on a front side of the PCB 2112 and at a position such that it fits into the space formed by the rounded corners of the two IPT coils 2106/2116 and into the portion of the ferrite layer 2104 that has a reduced or zero thickness. This may advantageously allow for more compact construction and reduced dimensions of the base pad assembly.

Figure 23:
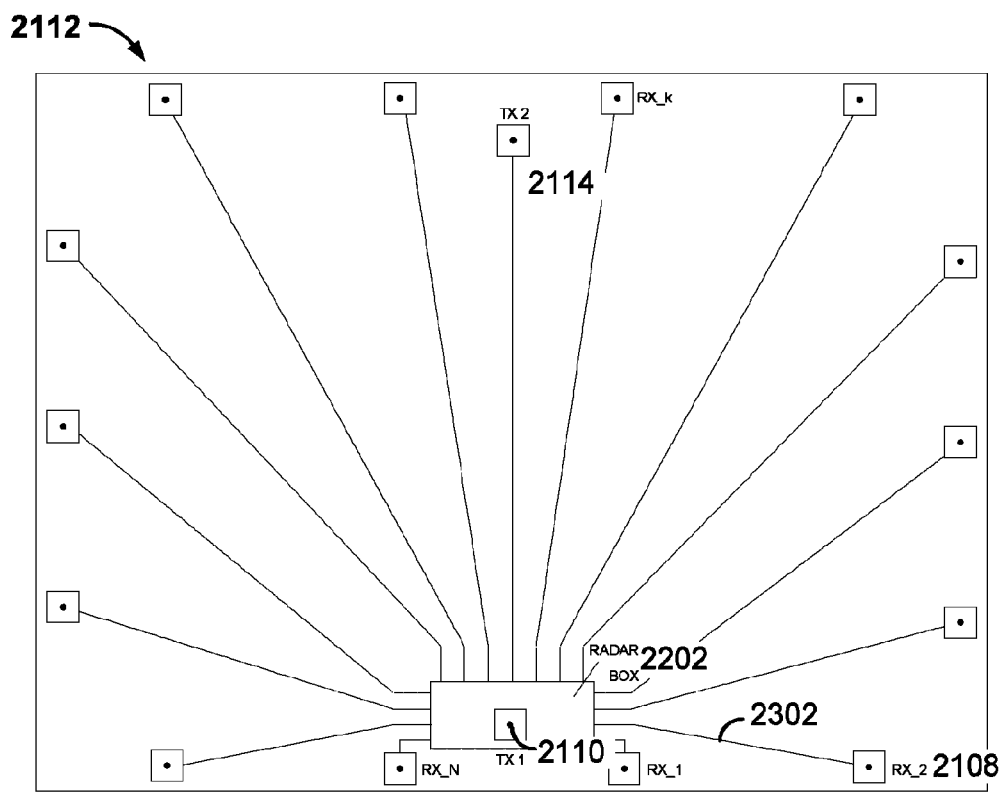
FIG. 23 shows a printed circuit board having the radar antenna arrangement shown in FIG. 21.

FIG. 23 shows the printed circuit board 2112 having the radar antenna arrangement 2100 shown in FIG. 21. The PCB 2112 may comprise the radar transmit antennas 2110 and 2114 and the plurality of radar receive antennas 2108. The PCB 2112 may serve as a carrier for the antennas 2108/2110/2114, a plurality of antenna feeder lines 2302, and the radar detector unit 2202. The radar detector unit 2202 may integrate all active circuitry as previously described in connection with FIGS. 8-12.

The PCB 2112 may be made of a standard glass fiber reinforced plastic, e.g. FR4, however, having locally embedded low loss substrate material for the feeder lines 2302. For the feeder lines 2302, any of the known microwave transmission line techniques such as strip line, microstrip line, coplanar line, slot line, etc. may apply. Strip lines that use a flat strip of metal sandwiched between a top and bottom ground plane may be considered particularly useful as the EM fields are not influenced by the materials that may be above and below the PCB 2112.

Figure 24:
FIG. 24 shows a side view of the printed circuit board of FIG. 23.

FIG. 24 shows a side view 2400 of the printed circuit board 2112 of FIG. 23. As shown, the radar detector unit 2202 is disposed on the front side of the PCB 2112 in the portion of the ferrite layer 2104 that has a reduced or zero thickness.

Figures 25, 26:
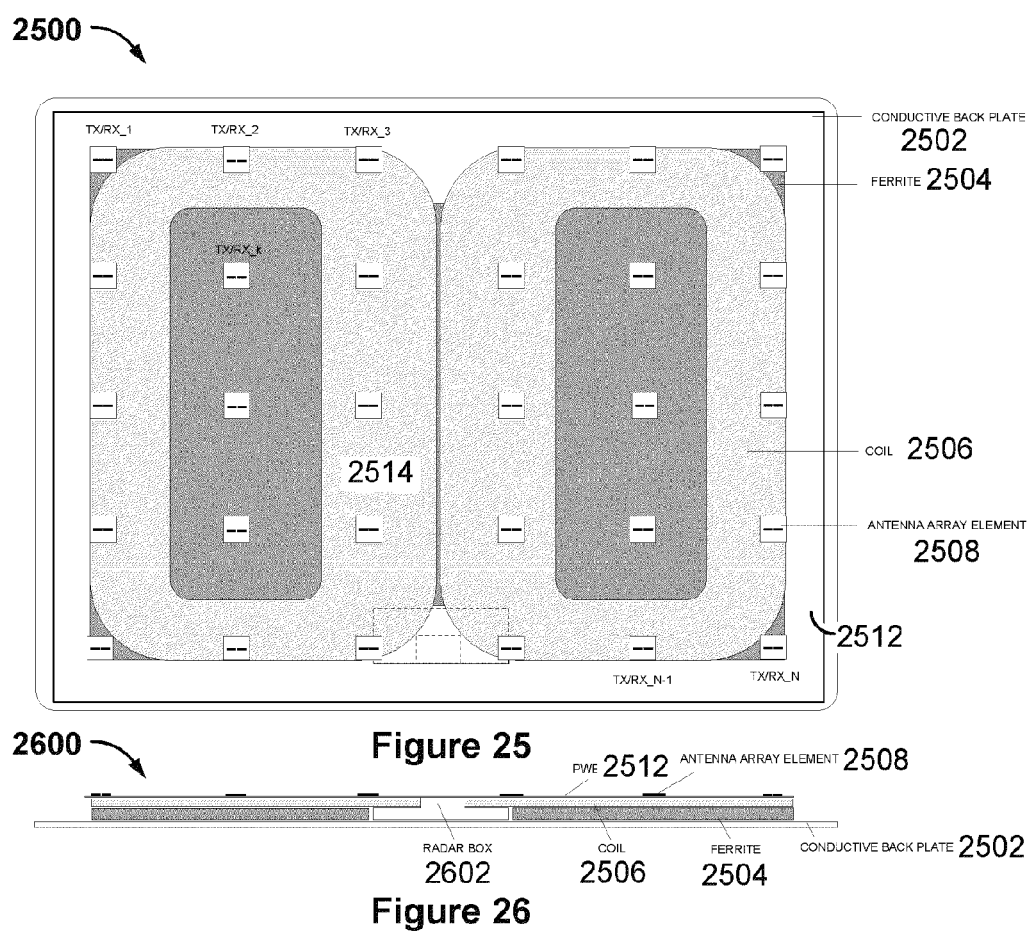
FIG. 25 shows an arrangement of paired transmit and receive radar antennas or single radar antennas for both transmitting and receiving disposed in an array over a planar double coil IPT coupler ("Double D" pad), in accordance with an exemplary implementation.
FIG. 26 shows a side view of the arrangement of radar antennas of FIG. 25.

FIG. 25 shows an arrangement 2500 of paired transmit and receive radar antennas or single radar antennas for both transmitting and receiving disposed in an array over a planar double coil IPT coupler ("Double-D" pad), in accordance with an exemplary implementation. The arrangement 2500 may include a conductive back plate 2502, a ferrite layer 2504 disposed over the conductive back plate 2502, a first coil 2506 and a second coil 2514 disposed over the ferrite layer 2504. The arrangement 2500 may additionally include a PCB 2512 disposed over the first and second coils 2506/2514. The PCB 2512 may include an array of radar antennas. Each element 2508 of the array may comprise either a single antenna for both transmission and reception, as previously described in connection with FIG. 6, or alternatively a pair of antennas, a first antenna for transmitting and a second antenna for receiving, as previously described in connection with FIG. 7. The antenna array elements 2508 may be placed in a regular pattern across the area of the IPT pad and/or PCB 2512. For a s21-type radar, antennas may be configured for shortest transmission paths, for example between pairs of neighboring elements in the array.

FIG. 26 shows a side view 2600 of the arrangement 2500 of radar antennas of FIG. 25. As shown in FIG. 26, a radar detector unit 2602 may be specially shaped and disposed substantially on the back side of the PCB 2512 in the portion of the ferrite layer 2504 that has a reduced or zero thickness. This may advantageously allow for more compact construction and reduced dimensions of the base pad assembly.

Figure 27:
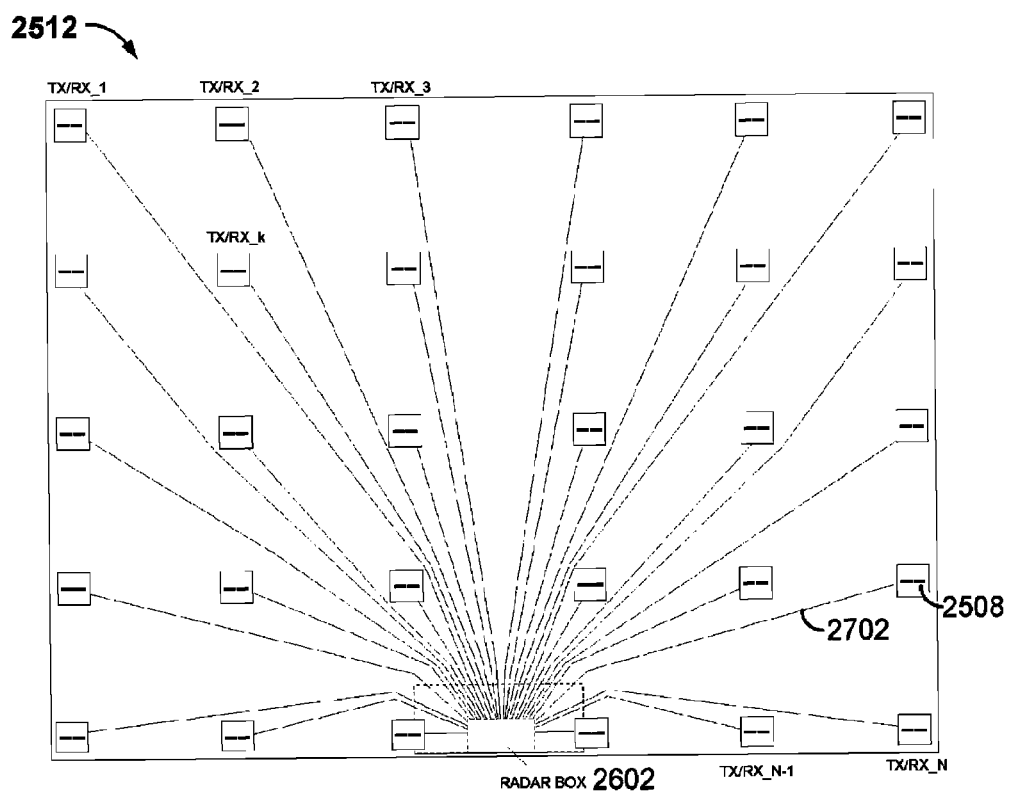
FIG. 27 shows a printed circuit board having the radar antenna arrangement shown in FIG. 25.

FIG. 27 shows a printed circuit board 2512 having the radar antenna arrangement 2500 shown in FIG. 25. The PCB 2512 comprises the array of radar antennas 2508. The PCB 2700 may serve as a carrier for the antennas 2508, a plurality of antenna feeder lines 2702, and the radar detector unit 2602. The radar detector unit 2602, which may be mounted on a backside of the PCB 2512, where magnetic flux density is relatively low and where ferrite may be omitted without significant loss of performance. The radar detector unit 2602 may integrate all active circuitry as previously described in connection with FIGS. 8-12.

The radar antennas 2508 may be printed on the PCB 2512. Regarding construction, the PCB 2512 may be substantially the same as the PCB 1312 of FIG. 15. The PCB 2512 may further comprise locally embedded low loss substrate material for the feeder lines 2702, just as described in connection with FIG. 15.

Figure 28:
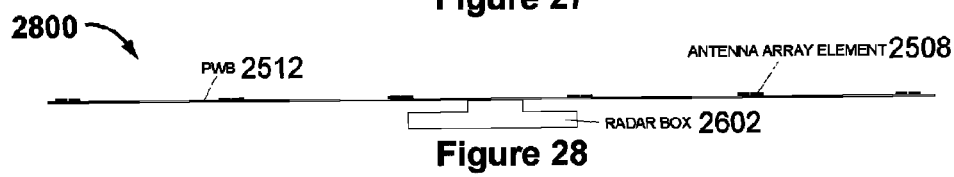
FIG. 28 shows a side view of the printed circuit board of FIG. 27.

FIG. 28 shows a side view 2800 of the printed circuit board 2512 of FIG. 27. As shown, the radar detector unit 2602 is disposed substantially on the back side of the PCB 2512.

With respect to FIGS. 4, 5, 7 and 13-28 antennas indicated as radar transmit antennas may be configured as radar receive antennas and vice versa, since the propagation channel as seen between a pair of antenna ports may be considered reciprocal.

Detection reliability, which may be defined in terms of detection probability at a specified false alarm probability, may be controlled to a certain extent by the system complexity, for example the number of radar channels. The larger the number of antennas, the more radar channels can be formed and the higher the detection reliability generally becomes. A suitable number of antennas for an s21-based radar system may be 16, while for an s11-based system the number may be 30.

Figure 29:
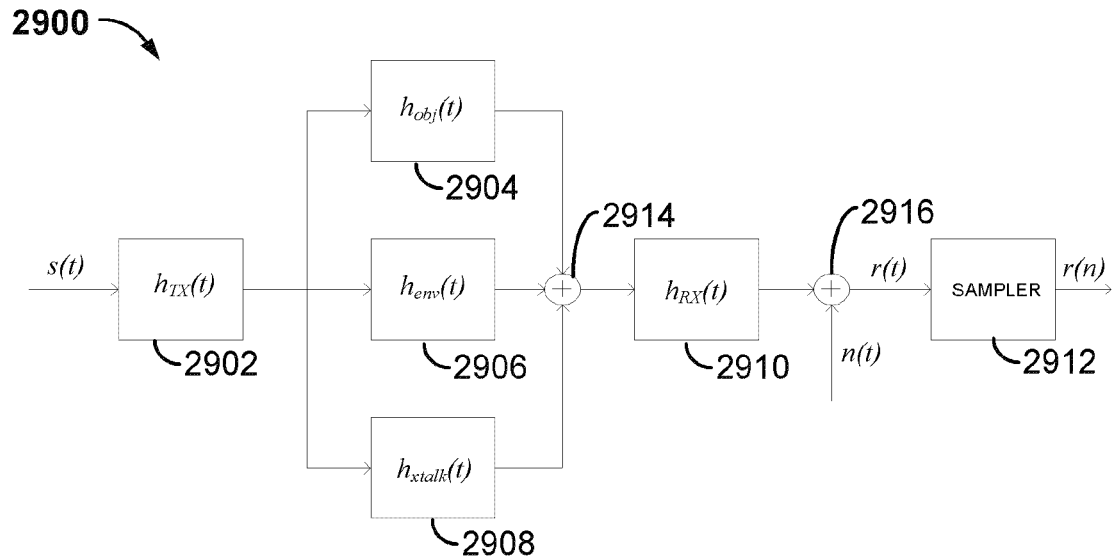
FIG. 29 shows a linear system model of a radar system configuration including propagation paths and the radar transceiver's internal cross-talk, in accordance with an exemplary implementation.

FIG. 29 shows a linear system model 2900 of a radar system configuration including propagation paths and the radar transceivers internal cross-talk, in accordance with an exemplary implementation. In system model 2900, all described signals and responses shall be considered as complex base band representations, and all discrete time samples shall be considered as complex numbers. The system model 2900 shows an input transmit pulse s(t), which may be assumed a Dirac pulse, input to a box 2902 representing a radar transmitter impulse response $h_{TX}(t)$, which includes the impulse response of the modulator, of the amplifier stages and of any linear signal distortion effect in the transmitter, as previously described in connection with either or both of FIGS. 8 and 9. The model may then branch off into three separate boxes 2904, 2906 and 2908. The box 2904 may represent an impulse response of a foreign object $h_{obj}(t)$, representing a change in signal propagation due to the presence of at least one foreign object. The box 2906 may represent an impulse response of the environment $h_{env}(t)$, representing all propagation paths, which may include direct surface wave, reflected and diffracted waves at any structure in range as given by the sensitivity of the radar system, excluding any foreign objects, but including linear distortion effects caused by transmit and receive antenna as well as antenna feeder lines. The box 2908 may represent an impulse response for crosstalk $h_{xtalk}(t)$, representing the radar detector unit's internal transmit-to-receive path signal crosstalk. The response of each of the boxes 2904, 2906 and 2908 may be summed at a summer 2914 and then passed to a box 2910, which may represent an impulse response of the receiver $h_{RX}(t)$ including the impulse response of an input filter, preamplifier, demodulator, correlator and any linear signal distortion effect in the receiver, as previously described in connection with FIGS. 8 and 9. The output of the box 2910 may be input to a summer 2916 where it is summed with an additive noise component n(t), which includes any thermal noise effect and possibly also some phase noise effects, to output a modeled received radar response r(t). The received radar signal r(t) may be input to a sampler 2912, which outputs a discrete-time representation of the received radar response r(t), where r(n) denotes the $n^{th}$ sample in the sequence, with numbers n in a range covering the time interval of interest for the particular radar application.

The model 2900 may principally apply to either a transmission type (s21) system, as shown in any of FIGS. 4, 5, and 7, or to a reflection type (s11) radar system, as shown in FIG. 6, and to a simple pulse radar as defined herein. Furthermore, the model 2900 may apply to a radar system transmitting any pseudo-noise sequence or any other signal that is transformed into a pulse when correlated in the receiver. All these radar systems may be modeled using an ideal transmit pulse and some linear distortion (pulse shaping) functions. Where the system is a PN-sequence radar system, the transmitter impulse response 2902 and the receiver impulse response 2910 are also considered as including pulse shaping and linear distortion effects of the PN-code modulator and linear distortion effects of the correlator, respectively.

Figure 30:
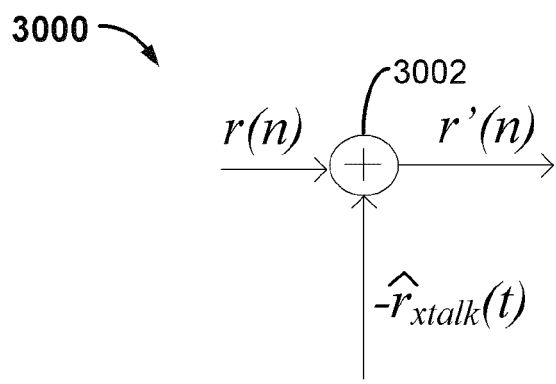
FIG. 30 shows a model of crosstalk cancellation, in accordance with an exemplary implementation.

FIG. 30 shows a model 3000 of crosstalk cancellation, in accordance with an exemplary implementation. To maximize the effect of a foreign object and thus enhance the detection performance, the sequence r(n) output from the sampler 2912 of FIG. 29, may be further processed. In some implementations, the measured cross-talk $\hat{r}_{xtalk}(n)$ is subtracted from sequence r(n) at summer 3002 in a first step of signal processing. The measured cross-talk $\hat{r}_{xtalk}(n)$ that is subtracted from the samples r(n) may be considered a filtered/averaged version of consecutively received sequences $r_{xtalk}(n)$. The resulting time sequence in normal system operation/configuration is denoted r'(n).

Figure 31:
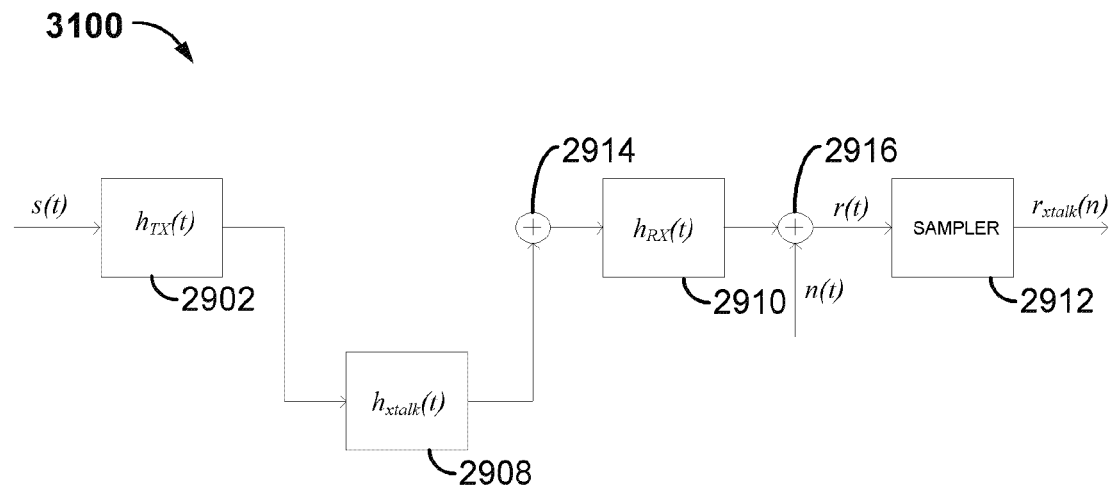
FIG. 31 shows a linear system model of a radar system configuration for measuring the radar transceiver's internal cross-talk, in accordance with an exemplary implementation.

FIG. 31 shows a linear system model 3100 of a radar system configuration for measuring the radar transceivers internal cross-talk, in accordance with an exemplary implementation. As shown, model 3100 includes all boxes shown in model 2900 with the exception of box 2904 representing the impulse response of a foreign object $h_{obj}(t)$, and the box 2906 representing the impulse response of the environment $h_{env}(t)$.

Figure 32:
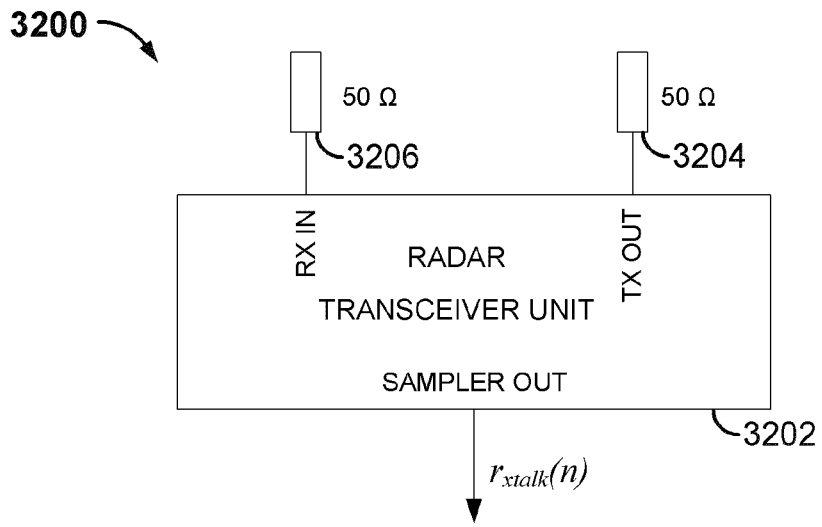
FIG. 32 shows an antenna port termination arrangement for cross-talk measurement in a radar transceiver unit, in accordance with an exemplary implementation.

FIG. 32 shows an antenna port termination arrangement 3200 for cross-talk measurement in a radar transceiver unit, in accordance with an exemplary implementation. The internal cross-talk of the radar detector unit 3202 may be measured by disconnecting transmit and receive antennas from the transmit and receive ports, respectively, and using absorptive switches, terminated with 50 Ohm resistors 3204 and 3206 for example, when the switches are open.

In a second step of signal processing, the overall impulse response of the radar system may be equalized using an equalizing filter $h_{eq}(n)$. Equalizing or flatting the overall radar frequency response, which corresponds to pulse sharpening in the time domain, may result in higher time/distance resolution. Higher time/distance resolution may be advantageous for discriminating unwanted radar echo paths and increasing sensitivity of the foreign object detection system. Equalizing may be particularly useful, if the system frequency response of the radar transceiver would exhibit a roll-off stronger than expected from its theoretical modulation spectrum and if the receive signal-to-noise ratio (SNR) is sufficiently high.

Figure 33:
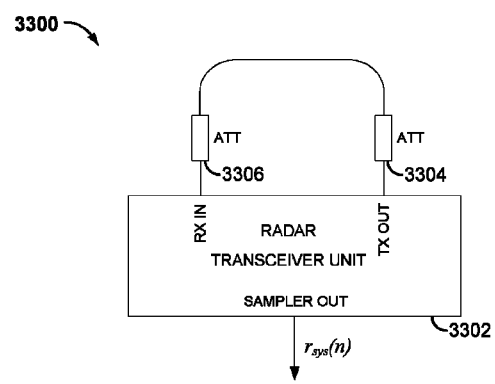
FIG. 33 shows an antenna port bypass arrangement for measuring a radar system's impulse response, in accordance with an exemplary implementation.

For this second step, a second measurement of the so-called system impulse response $h_{sys}(n)$ is needed. FIG. 33 shows an antenna port bypass arrangement 3300 for measuring a radar system's impulse response, in accordance with an exemplary implementation. The system impulse response may be measured by directly connecting the transmit antenna port to the receive antenna port of the radar detector unit 3302 via an attenuator 3304/3306. Once the antenna ports are connected to one another via the attenuators 3304/3306, the crosstalk between transmit and receive paths may be subtracted out and consecutively received sequences of $r_{sys}(n)$ may be filtered/averaged to obtain the pure system impulse response.

Figure 34:
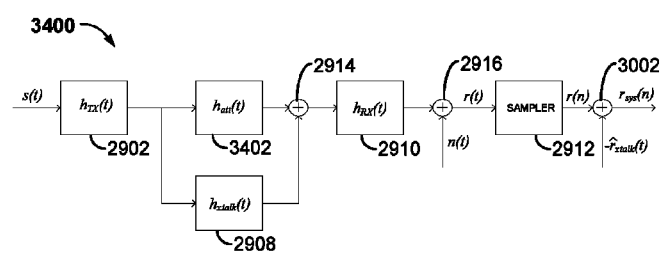
FIG. 34 shows a linear system model of a radar system configuration for measuring the system's response, in accordance with an exemplary implementation.

FIG. 34 shows a linear system model 3400 of a radar system configuration for measuring the system's response, in accordance with an exemplary implementation. The model 3400 may include substantially all components of the model 2900 of FIG. 29 with the exception of box 2904 representing the impulse response of a foreign object $h_{obj}(t)$, and the box 2906 representing the impulse response of the environment $h_{env}(t)$, which is replaced by the box 3402 representing the impulse response of the attenuators 3304/3306, since they now represent the entire environmental impulse response. To show subtraction of the crosstalk between transmit and receive paths, the model 3400 additionally includes the summation step previously described in connection with FIG. 30, providing a discrete-time system response $r_{sys}(n)$ at the output. The output $r_{sys}(n)$ of FIG. 34 may correspond to the output r'(n) previously described in connection with FIG. 30.

Once this system response $r_{sys}(n)$ has been determined, an equalizing filter utilizing an inverse function of the system response may be utilized to cancel out the system response. This equalizing filter with input r'(n) and an output r"(n) may be best described in the discrete frequency domain by using the discrete Fourier transformed (DFT) versions:

$$R'(k) = F\{r'(n)\} \qquad \text{Eq. 2:}$$

and $$R''(k) = F\{r''(n)\} \qquad \text{Eq. 3:}$$

where F{•} denotes the Discrete Fourier Transform (DFT), and k the k-th sample of the frequency sequence.

The inverse of the measured complex system frequency response of Eq. 4 is used as the equalizing filter $H_{eq}(k)$, as shown by Eq. 5:

$$\hat{H}_{sys}(k) = F\{\hat{h}_{sys}(n)\} \qquad \text{Eq. 4:}$$

$$H_{eq}(k) = F\{h_{eq}(n)\} = \hat{H}_{sys}^{-1}(k) = 1/\hat{H}_{sys}(k) \qquad \text{Eq. 5:}$$

The output of the equalizing filter may be expressed in discrete frequency domain as:

$$R''(k) = (S(k)H_{sys}(k) + N(k))\hat{H}_{sys}^{-1}(k) =$$

$$S(k)H_{sys}(k)\hat{H}_{sys}^{-1}(k) + N(k)\hat{H}_{sys}^{-1}(k) =$$

$$S(k)H_{sys}(k)\hat{H}_{sys}^{-1}(k) + N'(k) \cong$$

$$S(k) + N'(k) \qquad \text{Eq. 6:}$$

where $S(k) = F\{s(n)\}$, $H_{sys}(k) = F\{h_{sys}(n)\}$, $N(k) = F\{n(n)\}$.

In a third step, the output of the equalizing filter may be filtered to reduce the noise/error variance in the received and equalized radar response r"(n). An "optimum" noise filter e.g. minimizing the mean-square error in the filter output sequence r"(n) can be found using well known estimation theory:

$$H_{opt}(k) = \frac{S(k)S(k)^*}{S(k)S(k)^* + \hat{\Phi}_{N'}(k)} = \frac{1}{1 + \hat{\Phi}_{N'}(k)} \qquad \text{Eq. 7}$$

where $S(k) = F\{s(n)\} = F\{\delta(n)\}$, $S(k)^*$ is the conjugate complex of S(k), $$\delta(n) = \begin{cases} 1, & n = 0 \\ 0, & n \neq 0 \end{cases}$$

the unit-sample sequence, and $\hat{\Phi}_{N'}(k)$ is an estimate of the spectral density of the filter output noise process $\Phi_{N'}(k)=E\{N'(k)N'(k)^*\}$, where $N'(k)$ denotes a realization of the noise process after the equalizer and $E\{\bullet\}$ denotes the expectation value.

By inspecting Eq. 7 above for the optimum noise filter, it can be recognized that the filter $H_{opt}(k)$ will automatically broaden the frequency response of the received radar signal if the signal-to-noise ratio (SNR) is high but will narrow the frequency response if the SNR is low. In low SNR conditions, the effect of the equalizing filter $H_{opt}(k)$ may result in a sacrifice in time resolution for the sake of less noise error. In fact, at low SNR conditions, the filter cascade of $\hat{H}_{sys}^{-1}(k)$ and $H_{opt}(k)$ may act as a noise reduction filter. The noise estimator for $\Phi_{N'}(k)$ may be part of the digital processing function of the radar detector unit shown in FIGS. 8 and/or 9.

In a fourth step, the received equalized and noise filtered radar response may be additionally filtered using a windowing function $H_{win}(k)$ to suppress side lobes in the impulse response, caused by the time/frequency processing. Windowing, however, will cause a reduction in time resolution. A suitable windowing function in the frequency domain may have a roll-off portion and a flat portion. The roll-off portion may be defined by a raised-cosine function, for example. The roll-off factor, e.g., the share between roll-off portion and flat portion, is a parameter that may be chosen as required and as appropriate for a particular application.

Figure 35:
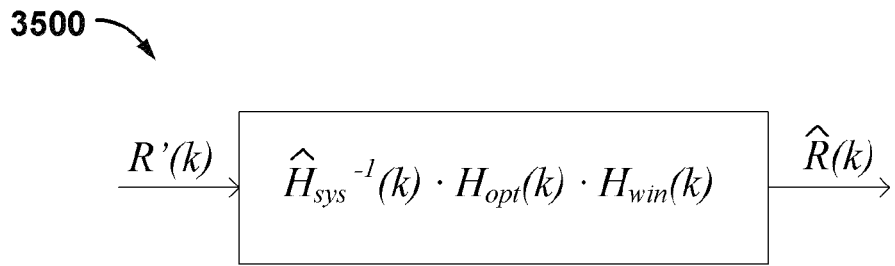
FIG. 35 illustrates a discrete frequency domain post processing cascade for a radar system, in accordance with an exemplary implementation.
Figure 36:
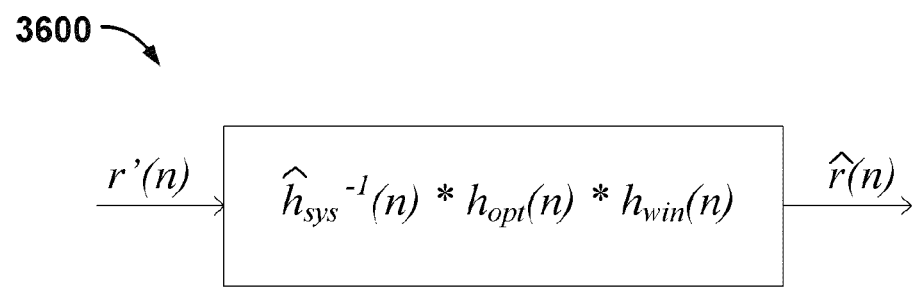
FIG. 36 illustrates a discrete time domain post processing cascade for a radar system, in accordance with an exemplary implementation.

The cascade of filtering functions may preferably be implemented on a digital signal processor using the frequency domain representation of the filter functions as shown in FIG. 35, corresponding to the time domain representation as shown in FIG. 36. FIG. 35 illustrates a discrete frequency domain post processing cascade 3500 for a radar system, in accordance with an exemplary implementation. FIG. 36 illustrates a discrete time domain post processing cascade 3600 for a radar system, in accordance with an exemplary implementation. In the frequency domain, convolution operations (*) correspond to simple sample-by-sample complex multiplications. Frequency domain processing requires the received radar response $r'(n)$ to first be transformed into discrete frequency domain using a Fast Fourier Transform (FFT). After the filtering operations, sequences may be transformed back by means of an inverse FFT, providing the equalized, noise filtered and windowed time response:

$$\hat{r}(n) = F^{-1}\{\hat{R}(k)\}. \qquad \text{Eq. 8:}$$

Where relatively small foreign objects are to be detected in an environment with strong signal reflections, also called radar clutter, the foreign object detection system may require strong echoes from the environment to be neutralized. This procedure may be called "calibration", "learning", or "clutter cancellation". Calibration may be performed by measuring and storing a reference radar response $r_{ref}(n)$ in the absence of any foreign object and subtracting the reference response from each received radar response. In reference to the linear system model 2900 of FIG. 29, this reference response $r_{ref}(n)$ is equivalent to a noisy and filtered version of the true impulse response of the environment $h_{env}(n)$, a discrete-time version of $h_{env}(t)$.

Figure 37:
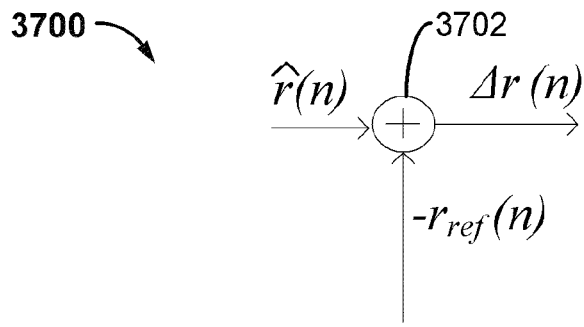
FIG. 37 shows a model of reference radar response subtraction for system calibration, in accordance with an exemplary implementation.

FIG. 37 shows a model of reference radar response subtraction for system calibration, in accordance with an exemplary implementation. In FIG. 37, calibration is performed on the time sequence $\hat{r}(n)$, after equalizing, noise filtering, and windowing, by subtracting the stored reference $r_{ref}(n)$ from $\hat{r}(n)$ at summer 3702, delivering the true radar response $\Delta r(n)$ of interest. In the absence of a foreign object and for a perfectly calibrated system, $\Delta r(n)$ is virtually zero for all n. Thus, a sufficiently large object placed within the detection space will cause a non-zero radar response $\Delta r(n)$.

In some other exemplary implementations, detection is performed based on the absolute magnitudes $|\hat{r}(n)|$ rather than on the complex samples $\hat{r}(n)$. Relying on absolute magnitudes eliminates the requirement for phase coherence between radar transmitter and radar receivers, enabling solutions where transmit and receive units are at different locations and running without mutual phase synchronization. Detecting absolute magnitudes may also be deliberately chosen to reduce any disturbance effect from a changing radar environment as will be addressed in more detail below. Calibration may then be performed based on the absolute magnitudes $|\hat{r}(n)|$ rather than on the complex samples $\hat{r}(n)$.

A system using a plurality of antennas may provide a plurality of radar responses that may be denoted by $\Delta r_i(n)$, with $i=1 \ldots M$. The index i is called the space index since it designates radar responses received and/or transmitted at different spatial locations. These M responses may have been obtained either by a transmission type (s21) radar or by a reflection type (s11) radar, or by both using any of an appropriate antenna arrangement and configuration, as previously described in connection with any of FIGS. 4-7 and 13-28. In general, these radar responses will be differently affected by a foreign object.

There exist several approaches to detecting an object based on the equalized, filtered, and "cleaned" radar responses $\Delta r_i(n)$. One such approach uses simple threshold detection to determine the presence of a foreign object. If at least one sample of any of the set of acquired responses $\Delta r_i(n)$, with $i=1 \ldots M$ has a magnitude $|\Delta r_i(n)|$ that exceeds a determined threshold, the system may make a determination that an object is present. If no sample exceeds the determined threshold a determination may be made that an object is not present.

The determined threshold may be a fixed value or a variable value that is obtained through a threshold assessment. It may be a constant value for all $0 \leq n \leq N-1$, where N is the sequence length, or it may be a variable value that is a function of n. The threshold may be derived from one or more consecutively received radar responses $\Delta r_{i,j}(n)$, where j denotes the time index, through a statistical assessment, for example using Bayesian rules, using Neyman-Pearson test trading-off detection probability vs. false detection probability, by estimating a noise variance, by computing a percentile from a histogram, by computing moments of the discrete function $\Delta r_{i,j}(n)$ e.g. the first moment (center of gravity) and the second moment (a measure of the spread of the response).

Additionally, time gating may apply, meaning that for object detection only samples $\Delta r_{i,j}(n)$ of a limited, relevant time interval $N_1 \leq n \leq N_2$ are taken into the decision process. In yet another approach, the position of a peak value of the radar response $\Delta r_{i,j}(n)$ in the time interval $N_1 \leq n \leq N_2$ may be taken into account during the decision process.

Figure 38:
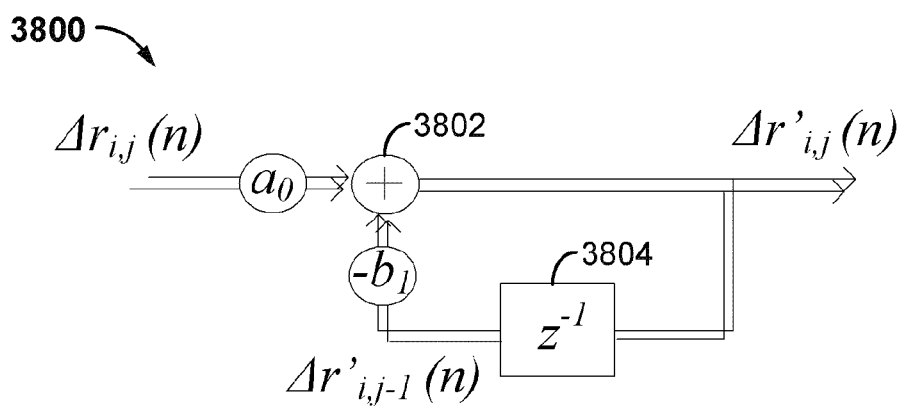
FIG. 38 illustrates a first order discrete-time infinite impulse response filter for time-differential detection of radar responses in a radar system, in accordance with an exemplary implementation.

In yet another approach, objects may be detected based on temporal changes in consecutively acquired radar responses $\Delta r_{i,j}(n)$. FIG. 38 illustrates a first order discrete-time infinite impulse response filter 3800 for time-differential detection of radar responses in a radar system, in accordance with an exemplary implementation. As shown in FIG. 38, time-differential detection may be accomplished by discrete-time "high-pass" filtering of the relevant parts of a time series of $\Delta r_{i,j}(n)$ with j=1, 2, . . . by using a delay element 3804 to feedback a negatively weighted ($-b_1$) single-sample-delayed response to a summer 3802. The IIR filter may be of higher order using a plurality of delay elements (e.g., a shift register). High-pass filtering may be considered equivalent to frequently recalibrating the system. Using time-differential detection, an object is only "visible" for a limited period after it has been introduced into the detection space. The response vanishes at a rate depending on the filter's time constant determined by filter coefficients $a_0$ and $b_1$ until the response is fully submerged below the noise floor of the detection system. However, it may become visible again when the object is removed from the detection space. This method may be largely insensitive to calibration errors and may even eliminate the need for calibration altogether.

In yet another approach, objects may be detected based on differences in the set of radar responses $\Delta r_{i,j}(n)$ with i=1 . . . M, concurrently acquired at time j. In an exemplary implementation, the system determines the presence of a foreign object if the set $\Delta r_{i,j}(n)$ contains at least one response where a threshold is surpassed and at least one response where the threshold is not surpassed. Where all values in the set $\Delta r_{i,j}(n)$ exceed the threshold, a change of the environment (e.g. a disturbance) is determined and the foreign object is assumed absent. This or similar decision methods may be categorized as a space-differential detection approach.

The above detection approaches may also be combined to form a joint space- and time-differential detection where maximum robustness against environmental changes is demanded. For example, supposing an acquisition rate is high enough, object detection may be expanded to the Doppler frequency domain. Such approaches may be useful to discriminate between moving and non-moving objects. In an exemplary method, sequences of consecutively acquired radar responses are transformed into the discrete Doppler domain. This may be accomplished using a sliding or moving DFT individually for each time delay n and over a block of $N_D$ consecutive samples $\Delta r_{i,j}(n)$ according to Eqs. 9-12:

$$\Delta R_{i,j}(k,0) = F\{\Delta r_{i,j-N_D+1}(0), \Delta r_{i,j-N_D+2}(0), \ldots \Delta r_{i,j-1}(0), \Delta r_{i,j}(0)\} \quad \text{Eq. 9:}$$

$$\Delta R_{i,j}(k,1) = F\{\Delta r_{i,j-N_D+1}(1), \Delta r_{i,j-N_D+2}(1), \ldots \Delta r_{i,j-1}(1), \Delta r_{i,j}(1)\} \quad \text{Eq. 10:}$$

$$\Delta R_{i,j}(k,n) = F\{\Delta r_{i,j-N_D+1}(n), \Delta r_{i,j-N_D+2}(n), \ldots \Delta r_{i,j-1}(n), \Delta r_{i,j}(n)\} \quad \text{Eq. 11:}$$

$$\Delta R_{i,j}(k,N-1) = F\{\Delta r_{i,j-N_D+1}(N-1), \Delta r_{i,j-N_D+2}(N-1), \ldots \Delta r_{i,j-1}(N-1), \Delta r_{i,j}(N-1)\} \quad \text{Eq. 12:}$$

The resulting 2-dimensional set of samples $\Delta R_{i,j}(k, n)$ that is updated every time instant j for each radar channel i, may be called a moving scattering function. The scattering function enables detection of objects selectively in at least one of a time-delay domain and Doppler shift domain by using at least one of a time-delay gating and Doppler shift gating to differentiate between moving and non-moving objects. Furthermore, peak values of the gated scattering function $\Delta R_{i,j}(k, n)$ in one of a time-delay and Doppler shift domain as well as differences in concurrently acquired $\Delta R_{i,j}(k, n)$ with i=1 M may be taken into the decision process.

To reduce the required computational power, the DFT may be performed block-wise only once after $N_D$ radar responses have been acquired. Alternatively, the DFT may be implemented as a moving DFT based on a recursive (infinite response) algorithm, for example using a Goerzel algorithm.

In another implementation, a digital low pass filter and a digital high pass filter may be used to discriminate between responses from moving and non-moving objects. In yet another implementation, a phase difference between corresponding samples of two consecutively acquired radar responses are computed to discriminate between responses from moving and non-moving objects. To reduce noise, additional time-averaging may be utilized.

In yet another implementation, simple CW radar signals are utilized and detection is performed only in the Doppler shift domain. However, such an implementation may not be able to detect stationary objects. In a multi-path propagation environment, radar responses in Doppler shift domain as received from a moving foreign object may be dispersed or scattered since the various propagation paths are generally differently affected by the Doppler effect.

Radar responses may be represented in a radar image so that characteristic patterns become "visible" e.g. for purposes of pattern recognition, graphical user interface, monitoring or demonstrating the functioning of a system.

Figure 40:
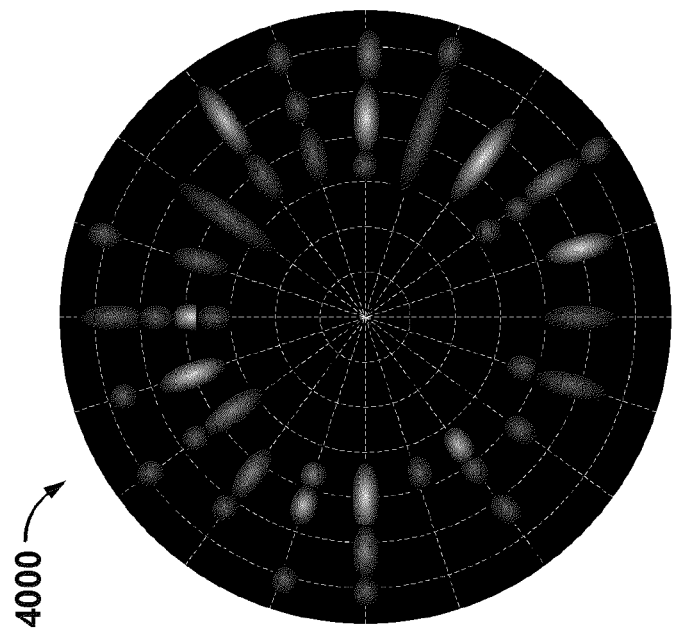
FIG. 40 shows an exemplary radar image of a radar response of a calibrated system after a vehicle has moved, in accordance with an exemplary implementation.
Figure 39:
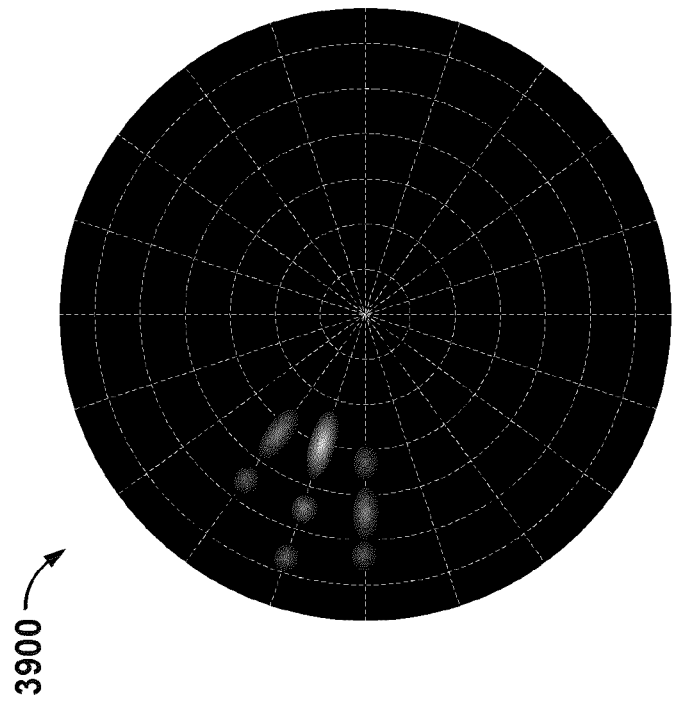
FIG. 39 shows an exemplary radar image of a radar response of a calibrated system in presence of a foreign object, in accordance with an exemplary implementation.

For a system in accordance with an exemplary implementation of the invention based on an s21-type radar having a number K of TX antennas and having, for each TX antenna, a number M of RX antennas (thus M radar channels), a radar image may be obtained by mapping the radar responses radially on a polar (spider) diagram as shown in FIGS. 39 and 40. FIG. 39 shows an exemplary radar image 3900 of a radar response of a calibrated system in presence of a foreign object, in accordance with an exemplary implementation. FIG. 40 shows an exemplary radar image 4000 of a radar response of a calibrated system after a vehicle has moved, in accordance with an exemplary implementation. In both FIGS. 39 and 40, discrete time-delay n is mapped radially as a distance ρ from the center of each diagram, each radar channel i is mapped to a different radial at discrete angles $\theta_i$, adjacent angles $\theta_{i-1}$ and $\theta_{i+1}$ preferably corresponding to physically adjacent radar receive antennas, where each angle may be denoted by the dotted lines extending radially from a center of each plot. The intensity of the samples $|\Delta r_{i,j}(n)|$ is mapped in z direction, which may be displayed by means of 2D black and white plot, a 2D or 3D pseudo-color plot, a 2D or 3D contour line plot, etc. A 2D interpolation function may be used to display a smooth appearance rather than discrete points. Preferably, a radar image is produced individually for each radar transmit antenna that belongs to a plurality of radar channels.

For a system in accordance with an exemplary implementation of the invention based on an s11-type radar having a number M of radar transmit/receive antennas or collocated radar transmit and radar receive antennas, a virtual 4D radar image may be produced. This may be accomplished by associating radar responses to an array of points in a Cartesian coordinate system, the points (x,y) representing the physical locations of the antennas, discrete time and intensity of the samples $|\Delta r_{i,j}(n)|$ are mapped on a u-axis and v-axis, respectively. A 4D image may be visualized by slicing the image producing a series of 2D pseudo color plots for selected time delay instances n.

For a system in accordance with an exemplary implementation of the invention based on detection in time-delay and Doppler domain as described above, the scatter function may be displayed using a suitable interpolation or smoothing function by means of 2D black and white plot, a 2D or 3D pseudo-color plot, a 2D or 3D contour line plot, etc. A 2D interpolation function may be used to achieve a smooth appearance rather than discrete points. Preferably, a scatter diagram is produced individually for each radar channel.

Where a foreign object detection system is based on sole detection in the Doppler domain, a radar image may be obtained by mapping Doppler responses (Doppler spectra) radially on a polar (spider) diagram as previously described in connection with FIGS. 39 and 40.

Radar images also may be created from consecutively acquired radar responses in the time-delay domain, in the Doppler domain, or in both domains. These images may be considered as temporal sequences of radar images, e.g. moving images.

In the presence of a vehicle, beside the direct, surface path the radar response as obtained from the different receivers of an s21-type system will typically show stronger and delayed components emanating from propagation paths (wave modes) reflected at the vehicle's underbody structure or at the vehicle pad. Some delayed components may reach the receive antenna even via multi-hop paths. These are waves alternately bouncing off of the vehicle structure and the base pad surface.

Figure 41:
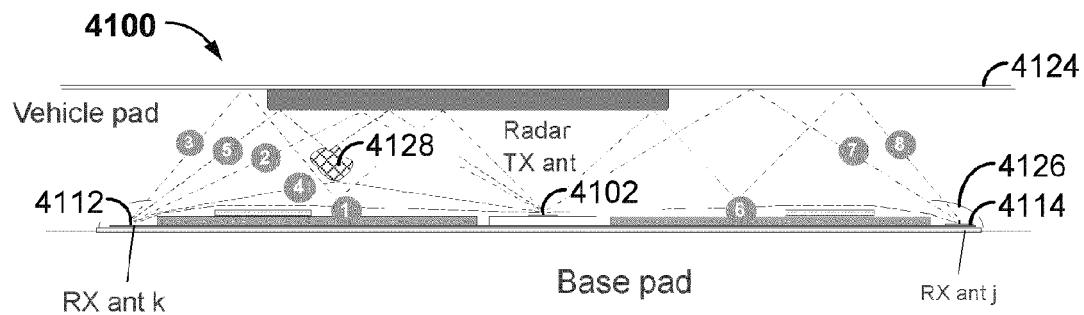
FIG. 41 illustrates multipath radar propagation in an exemplary radar system, in accordance with an exemplary implementation.

FIG. 41 illustrates multipath radar propagation in an exemplary radar system 4100, in accordance with an exemplary implementation. The multipath propagation scenario may correspond to an s21-type radar system having a central radar transmit antenna and a plurality of radar receive antennas placed along a periphery of the base pad, as previously described in connection with any of FIGS. 4, 5, 7, 13-16, and 21-24. For clarity, only major propagation paths are shown and labeled as shown by the circles labeled 1-8. The associated decomposed radar responses as possibly obtained at each of the radar receive antennas 4112 and 4114 are displayed in FIGS. 42 and 43, respectively. These responses should be considered only qualitatively illustrative and not quantitatively correct.

The scenario 4100 may include a base pad having a surface 4124, a radar transmit antenna 4102, at least a first radar receive antenna 4112 and a second radar receive antenna 4114. Also shown are a surface of a vehicle or vehicle pad 4126, a foreign object 4128 within the critical space to be monitored, and eight (8) exemplary propagation paths of radar signals transmitted by the radar transmit antenna 4102 and received by one or both of the first radar receive antenna 4112 and the second radar receive antenna 4114. Propagation path 1 may correspond to a direct path between the radar transmit antenna 4102 and the first radar receive antenna 4112. Propagation path 2 may correspond to a propagation path between the radar transmit antenna 4102 and the first radar receive antenna 4112 including a single reflection off of the vehicle surface 4126. Propagation path 3 may correspond to a propagation path between the radar transmit antenna 4102 and the first radar receive antenna 4112 including multiple reflections off of both the vehicle surface 4124 and the base pad surface 4124. Propagation path 4 may correspond to a propagation path between the radar transmit antenna 4102 and the first radar receive antenna 4112 including a reflection off of the foreign object 4128. Propagation path 5 may correspond to a propagation path between the radar transmit antenna 4102 and the first radar receive antenna 4112 including multiple reflections off of both the foreign object 4128 and the vehicle surface 4126.

Figure 42:
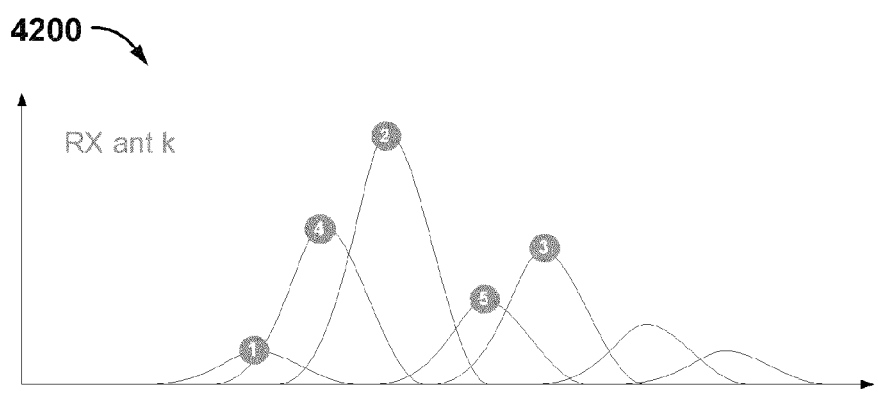
FIG. 42 illustrates an idealized decomposed radar response for transmit propagation paths associated with the first receive antenna of FIG. 41.

Propagation path 6 may correspond to a direct propagation path between the radar transmit antenna 4102 and the second radar receive antenna 4114. Propagation path 7 may correspond to a propagation path between the radar transmit antenna 4102 and the second radar receive antenna 4114 including a single reflection off of the vehicle surface 4126. And propagation path 8 may correspond to a propagation path between the radar transmit antenna 4102 and the second radar receive antenna 4114 including multiple reflections off of both the vehicle surface 4126 and the base pad surface 4124. Note that the eight propagation paths shown in FIG. 42 are exemplary and not exhaustive.

Figure 43:
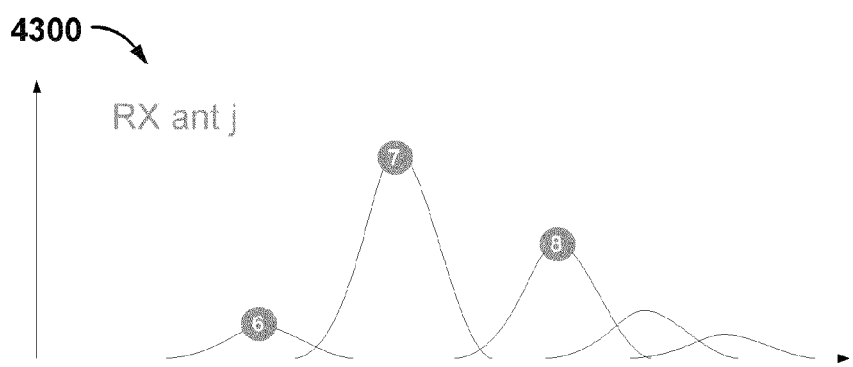
FIG. 43 illustrates an idealized decomposed radar response for transmit propagation paths associated with the second receive antenna of FIG. 41.

As previously described. FIG. 42 illustrates an idealized decomposed radar response 4200 for transmit propagation paths associated with the first receive antenna 4112 of FIG. 41. As shown, propagation paths 1-5 of FIG. 41 are associated with the first receive antenna 4112 of FIG. 41. FIG. 43 illustrates an idealized decomposed radar response 4300 for transmit propagation paths associated with the second receive antenna 4114 of FIG. 41. As show, propagation paths 6-8 of FIG. 41 are associated with the second receive antenna 4114 of FIG. 41.

In a system using a single radar transmit antenna and a plurality of radar receive antennas, a foreign object located at a position remote from the transmit antenna mainly affects radar responses of receive antennas closest to the object. However, if the object is placed near the transmit antenna, it generally affects the responses of all receive antennas, depending of its radar cross-section, shape, and orientation.

One major challenge for most approaches to FOD in a 3-dimensional space including the radar-based approach is movements of the vehicle. A vehicle parked over an inductive charging base cannot be considered absolutely static. Persons or other loads entering or leaving the vehicle as well as wind forces, snow fall, changes in tire pressure, etc. may cause sporadic or frequent, minor or major movements of the vehicle's underbody structure relative to the positions of the base unit that may integrate radar antennas. Such movements may be considered changes in the radar response of the environment $h_{env}(t)$ as previously described in connection with FIG. 29. Such changes may temporarily or permanently invalidate a previous calibration.

Susceptibility of a radar-based FOD method to such changes may depend on the frequency or wave length used for the radar system and on the systems general sensitivity to foreign objects. The shorter the wavelength, the more sensitive a system may be to movements of the vehicle.

However, movements of the vehicle chassis are highly likely to affect all radar channels in a similar manner and at the same time. Such an assumption may be valid for both an s21-type radar system as shown in FIGS. 4, 5, and 7, as well as an s11-type radar system as shown in FIG. 6. This characteristic may be used to mitigate disturbance effects from a moving vehicle and to differentiate between objects and unwanted environmental effects.

Movements of the vehicle chassis may be also detected using accelerometers installed onboard the vehicle. Signals from the accelerometers may be correlated with radar responses in order to mitigate disturbance effects from a moving vehicle. Such a system may correlate signals from at least one accelerometer aboard the vehicle with a time-series of radar responses for differentiating between moving foreign objects and a moving vehicle chassis. If correlation exceeds a defined threshold, detections are considered as being caused by movements of the vehicle.

Another challenge for a radar-based method may be snow, ice or water on the surface of the base unit that integrates the radar system. These environmental factors may also cause changes in the radar responses that may invalidate a calibration and that may change over time. A system using time-differential detection e.g. high pass filtering with a short enough time constant may be able to cope with slow movements of the vehicle but not with sudden changes such as those produced by a bouncing vehicle chassis, for example. However, a system based on both time-differential and space-differential detection as described above may be able to cope with slow as well as sporadic, rapid movements.

The above challenges may be met using an intelligently devised antenna arrangement and a sophisticated pattern recognition algorithm. Foreign objects as well as changes or disturbances to the radar environment may show characteristic patterns in a radar response. Such characteristic patterns may be found in a radar image that is produced in accordance with a method disclosed above, e.g. in the time-delay domain, in the Doppler domain, in both domains, or as a temporal sequence of moving radar images.

A system in accordance with an exemplary implementation may use pattern recognition for discriminating between foreign objects and disturbances. A pattern recognition algorithm may be trained on characteristic patterns in at least one of a time-delay domain and Doppler domain. It may be also trained based on characteristic patterns in temporal sequences of radar images.

Another system in accordance with an exemplary implementation of the invention uses adaptive pattern recognition, meaning for example, that the system applies different detection schemes and decision criteria depending on a presence or absence of the vehicle. An exemplary system may rely primarily on a space-differential detection scheme in the absence of the vehicle, while using both time- and space-differential detection in the presence of a vehicle.

Yet another system in accordance with an exemplary implementation of the invention is trained on characteristic patterns in time-delay responses (delay spectra). Certain characteristics and interrelations in the delay spectra as measured at different receiver sites as well as their temporal evolution may help for differentiating between responses from moving objects and clutter from the radar environment. Radar clutter may produce images with a more uniform spread as shown in FIG. 40, while objects generate more concentrated patterns as exemplarily shown in FIG. 39. Such characteristics may become apparent for antenna configurations with at least two TX antennas positioned at different locations e.g. as shown in FIG. 17, 21 or 24.

In an exemplary implementation, the system may compute at least one of a first moment (center of gravity) and a second moment (representative of the spread) of the time-delay in a radar image for discriminating between a foreign object and radar clutter. The radar image may be obtained with one of the imaging methods as described above. Another exemplary implementation uses triangulation methods, e.g. time of arrival (TOA), based on time delay data obtained in radar responses.

A fourth system in accordance with an exemplary implementation of the invention uses a simple CW radar system and uses pattern recognition in the Doppler domain. Certain characteristics and interrelations in the Doppler spectra as measured at different receiver sites as well as their temporal evolution may help discriminating between responses from moving foreign objects and radar clutter. In an exemplary implementation, the system may compute at least one of a first moment (center of gravity) and a second moment (representative of the spread) of the Doppler in a radar image. The radar image may be obtained with one of the imaging methods as described above.

Another exemplary implementation uses triangulation methods, e.g. frequency of arrival (FOA) techniques, based on Doppler data obtained in Doppler spectra to determine an object inside the critical space and to discriminate moving objects that are located outside of this space and/or movements of the vehicle chassis.

Another system in accordance with an exemplary implementation of the invention uses a suitably devised antenna arrangement and an algorithm, which in combination, act like a microwave guard zone or "curtain" around the critical space. Any object of detectable size passing within this zone will be potentially detected.

Figure 47:
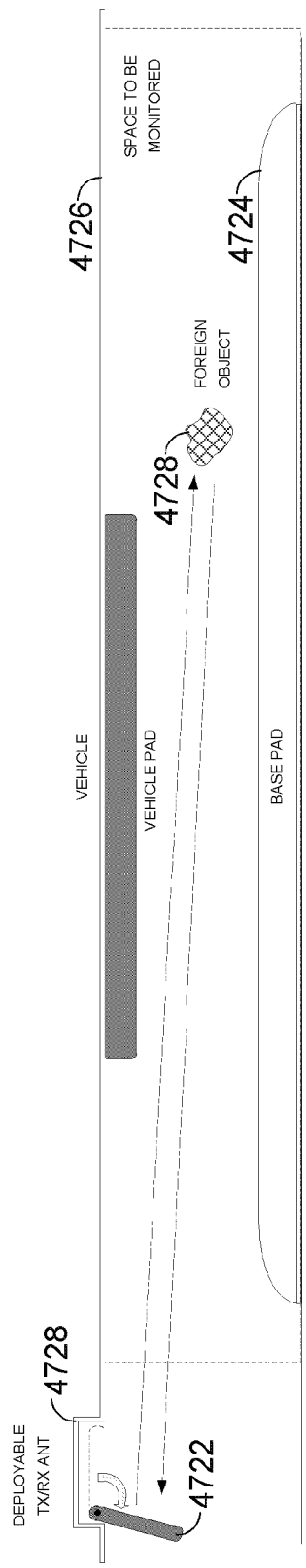
FIG. 47 illustrates a vehicle-sided deployable planar radar antenna, in accordance with an exemplary implementation.

Yet another system in accordance with an exemplary implementation uses a deployable antenna or deployable antenna system. FIG. 47 illustrates a vehicle-sided deployable planar radar antenna 4722, in accordance with an exemplary implementation. Although shown as the single antenna 4722, the present application contemplates arrangements where the single antenna 4722 comprises a plurality of antennas. The antenna 4722 may be deployed when the vehicle has parked over a charging base pad 4724. This deployable antenna 4722 may be vehicle mounted, as illustrated in FIG. 47, or may alternatively be part of the charging base pad 4724. If vehicle mounted and when not in use, the antenna 4722 may be stowed in a recess 4728 in the vehicle's underbody 4726. For use e.g. before power transfer is activated, one or more antennas 4722 may be deployed and lowered to a height suitable for monitoring the critical space. The antenna system may be one of a planar phased-array, a pair of horn antennas (for TX and RX) or one of any antenna type providing sufficient directivity.

Another approach to radar-based foreign object detection uses at least one directional TX/RX antenna and scanning techniques for monitoring the critical space. For scanning the critical space, the beam of the at least one radar antenna may be electronically or mechanically steered.

In yet another system in accordance with an exemplary implementation based on radar scanning, the critical space may be monitored using at least one antenna that is a planar (2D) phased-array. Such an antenna may be part of the base charging subsystem or may alternatively be disposed vehicle-side. The antenna may be a stand-alone (non-integrated) unit disposed at a location suitable for monitoring the space. If disposed vehicle side, when not in use the antenna may be stowed in a recess in the vehicle's underbody and deployed for use in a manner as illustrated in FIG. 47.

In yet another system in accordance with an exemplary implementation based on radar scanning, the critical space may be monitored using at least one antenna that is mechanically moving e.g. rotating or swinging. The antenna may comprise a single TX/RX horn antenna or a pair of horn antennas for TX and RX. If mounted vehicle-side, the horn antennas when not in use may be stowed in a recess in the vehicle's underbody and may be deployed for use e.g. before power transfer is activated.

Figure 48:
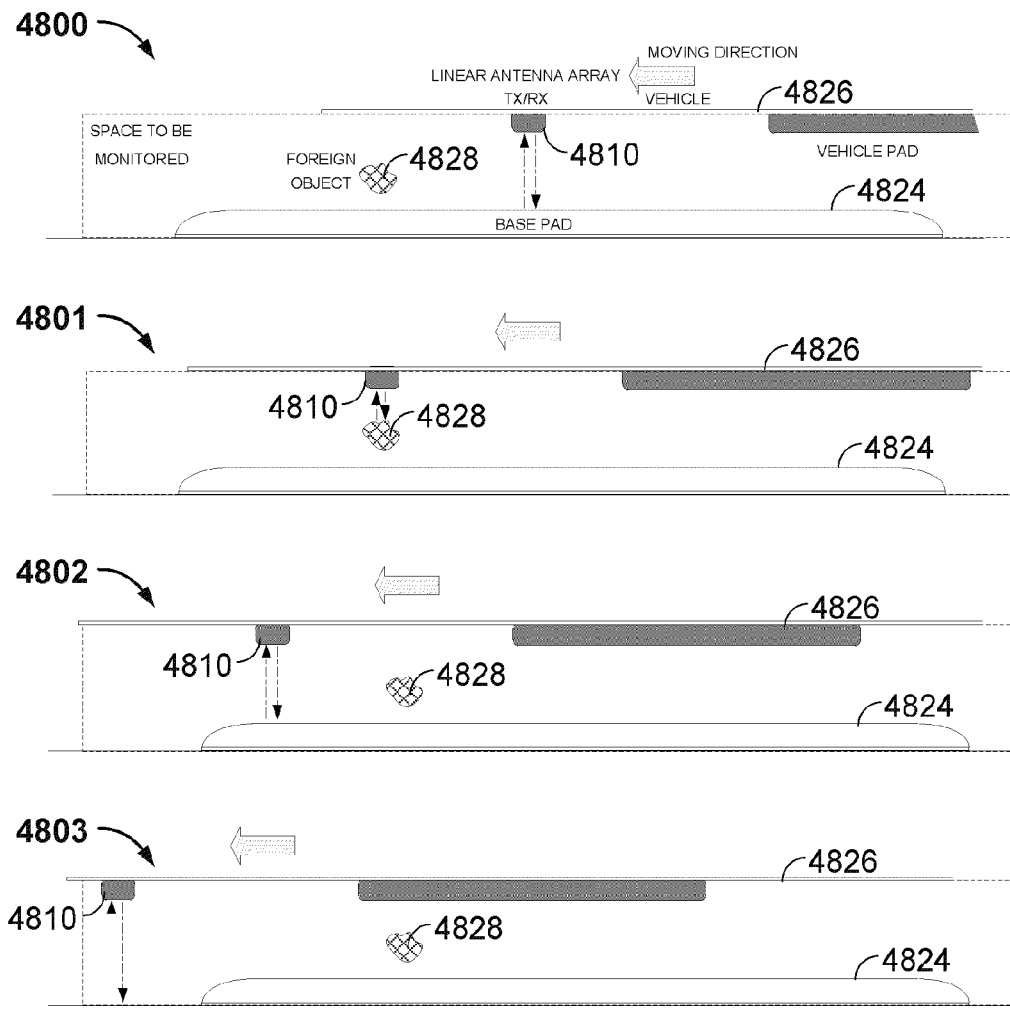
FIG. 48 illustrates multiple consecutive views of a vehicle-side radar system having a linear array of radar antennas for detecting foreign objects, in accordance with an exemplary implementation.

In a further system for foreign object detection based on radar scanning, the critical space may be scanned using a linear (one dimensional) array of TX/RX radar antennas. FIG. 48 illustrates multiple consecutive views 4800-4803 of a vehicle-side radar system having a linear array 4810 of radar antennas for detecting foreign objects 4828, in accordance with an exemplary implementation. Although only one antenna is visible, the array 4810 may have a plurality of antennas arranged in a one-dimensional array running along a direction into and out of FIG. 48, perpendicular to a primary direction of movement of the vehicle. The array 4810 may have a width (or length) in the direction of the array 4810 of at least the width (not shown) of the critical space. The antenna array 4810 may be mounted at a suitable location at the bottom of the vehicle 4826 and in front of or behind a vehicle charging pad in a primary direction of movement of the vehicle (shown as an offset to the left of the vehicle pad in the direction of the moving direction arrow). This primary direction of movement may be parallel to the direction of the vehicle's unturned tires in either a forward or reverse direction with respect to the vehicle. Such an arrangement ensures that as the vehicle approaches the charging base pad 4824 the linear array 4810 moves first over the critical space so that when the vehicle has stopped over the "sweet spot" for charging, the critical space has already been fully scanned. Consecutively acquired radar responses taken, for example, at the positions shown in each of consecutive views 4800, 4801, 4802 and 4803, together with real-time vehicle position data may be post processed such to produce a 3D radar topographic image of the critical space. Foreign objects 4828 may then be detected using pattern recognition techniques based on the topographic image. Post processing may include one of a Synthetic Aperture Radar (SAR) technique.

Radar-scanning while the vehicle is moving may be also accomplished using electronic beam steering and deflecting the beam in a direction perpendicular to the driving direction. This method may work with an antenna system (e.g. a phased array) that is physically shorter than the linear array described above in connection with FIG. 48 that may extend over a length of at least the width of the critical space.

Position data may be obtained from a vehicle speed sensor (e.g. a wheel speed sensor), from a vehicle onboard accelerometer or from a positioning system as used for guidance and alignment as described above.

Radar scanning while the vehicle is moving may be used for determining whether the critical space is "clear" (free from foreign objects) when the vehicle has parked on the "sweet" spot. One of another detection method described herein may apply for monitoring the critical space whilst the vehicle is being parked e.g. for charging.

Radar scanning may be also a solution for detecting foreign object on the road in a system where vehicles are charged while moving (dynamic charging and semi-dynamic charging) using a wireless charging infrastructure that is embedded within the road, for example. Foreign object detection is considered particularly important for semi-dynamic charging where the vehicles are moving slowly or temporarily standing still. Where the vehicle speed is high enough, the duration foreign objects are exposed to strong magnetic fields may be sufficiently short so that they will not heat above critical temperatures. This may be particularly true in a dynamic system using a multitude of road-embedded IPT coupler sections that are shorter than the length of the vehicle and that may be activated only for the time period the vehicle is above that power supply section.

A further system in accordance with an exemplary implementation may use defrosting or heating of at least one of a base unit or vehicle unit to avoid the above-mentioned issues with ice and snow.

Yet another system in accordance with an exemplary implementation may use microwave absorptive materials and/or surfaces in the enclosure of the vehicle pad and/or on the surrounding vehicle underbody structure to diminish effects from the radar environment, for example from the vehicle, which may improve detection reliability.

Active surfaces, e.g. meta materials, may be used to modify responses from the radar environment in a known manner. These active surfaces may be electronically controllable so as to modulate, phase shift, and/or frequency shift the reflected signals. A system in accordance with an exemplary implementation uses active surfaces for discriminating between foreign objects and radar clutter.

Another system in accordance with an exemplary implementation of the invention uses one or more distinct passive or active transponders, or tags, to mark signals retransmitted by the vehicle. Retransmitted signals may be at least one of a modulated, time-shifted, phase-shifted, and frequency-shifted version of the received signal. Signatures of these retransmitted signals may serve as at least a partial basis for discriminating between responses affected by foreign objects and responses from the environment.

A further system in accordance with an exemplary implementation may utilize means for shaking or vibrating foreign objects. Moving or vibrating objects can produce characteristic patterns in Doppler spectra that may be helpful for discriminating between foreign objects and radar clutter. For metallic objects, such means may be a pulsed magnetic field. A pulsed magnetic field may be generated by the base IPT coupler coil, for example, by modulating the primary current utilizing periodic on-off switching of the IPT power supply or by operating the IPT system from an unfiltered DC power supply producing a half sine-wave modulation at twice the power line frequency (e.g. 100 Hz, 120 Hz). This effect may be explained by eddy currents induced in the metallic object. Induced eddy currents cause magnetic forces (Lorentz forces) between the primary coil and the object according to Lenz's law. For an IPT system operating at $f_0$, these forces may be decomposed in a static force as well as an alternating force at double frequency $2f_0$ with a strength depending on the level and gradient of the magnetic field. If the primary field at $f_0$ is amplitude modulated by a very low frequency, e.g. <200 Hz, the "static" component may produce slight vibrations of the object, where the vibration amplitude largely depends on the size and mass of the object.

The above-disclosed methods and means may be used in combination and/or in a complementary fashion. They may also be used in combination or in a complementary fashion with other detection methods not specifically addressed or disclosed herein.

Another system in accordance with an exemplary implementation of the invention uses one of a combination of an inductive sensing method and a microwave radar method in a complementary fashion. For example, such a system may use inductive sensing for detecting metallic objects located on or near a surface where inductive sensors are integrated and microwave radar for detecting any foreign object in the complimentary space not covered by inductive sensing. Another implementation may use a more sensitive inductive method for detecting metallic object in a larger three-dimensional space when the vehicle is absent, whereas when the vehicle is present (e.g. parked over the base unit), inductive sensing may be used for objects near the surface in combination with a microwave radar method as described above.

Some components and functionalities of a radar-based FOD may be also synergistically used for vehicle positioning for purposes of vehicle guidance and alignment. A system in accordance with an exemplary implementation uses at least one radar system component synergistically for FOD and positioning. The component may be at least one of a radar transmitter, a radar receiver and a radar transponder. The radar transponder may be one of an active and passive transponder and it may be either part of the vehicle or part of the base charging unit. Positioning may be based on at least one of a time-of-arrival (TOA) and frequency-of-arrival (FOA) triangulation method.

Figure 44:
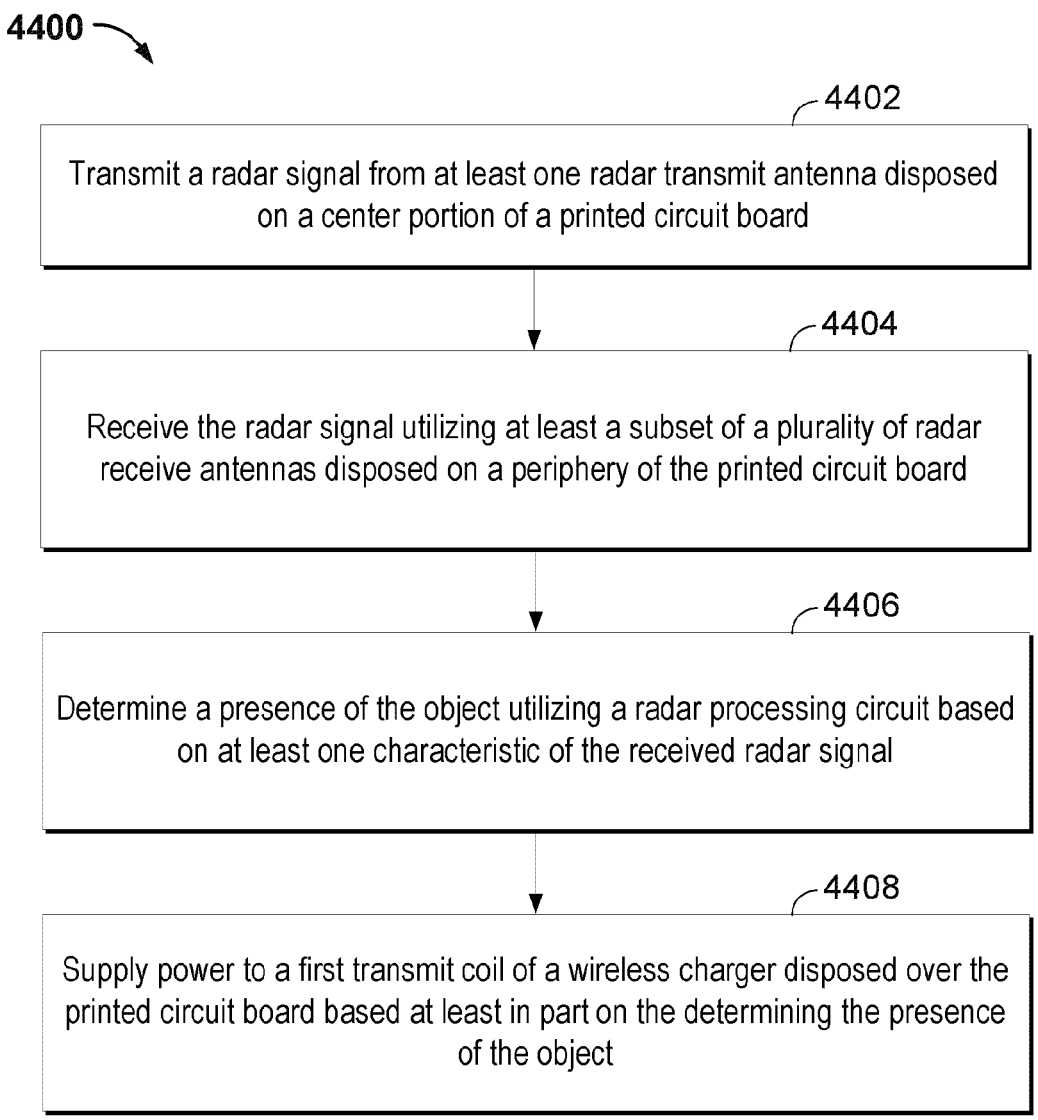
FIG. 44 is a flowchart of an exemplary method for radar-based detection of objects in a predetermined space, in accordance with an exemplary implementation.

FIG. 44 is a flowchart 4400 of an exemplary method for radar-based detection of objects in a predetermined space, in accordance with an exemplary implementation. The steps or actions described in FIG. 44 may be implemented in, or carried out by, any of the circuits, devices, or arrangements shown in FIGS. 4, 5, 7, 8-16 and 21-24 as further discussed in connection with any of FIGS. 29-43. Block 4402 may include transmitting a radar signal from at least one radar transmit antenna disposed on a center portion of a printed circuit board. Block 4404 may include receiving the radar signal utilizing at least a subset of a plurality of radar receive antennas disposed on a periphery of the printed circuit board. Block 4406 may include determining a presence of the object utilizing a radar processing circuit based on at least one characteristic of the received radar signal. For example, in one implementation, the radar processing circuit may be a circuit as previously described in connection with either of FIGS. 8 and 9. Block 4408 may include supplying power to a first transmit coil of a wireless charger disposed over the printed circuit board based at least in part on the determining the presence of the object.

Figure 45:
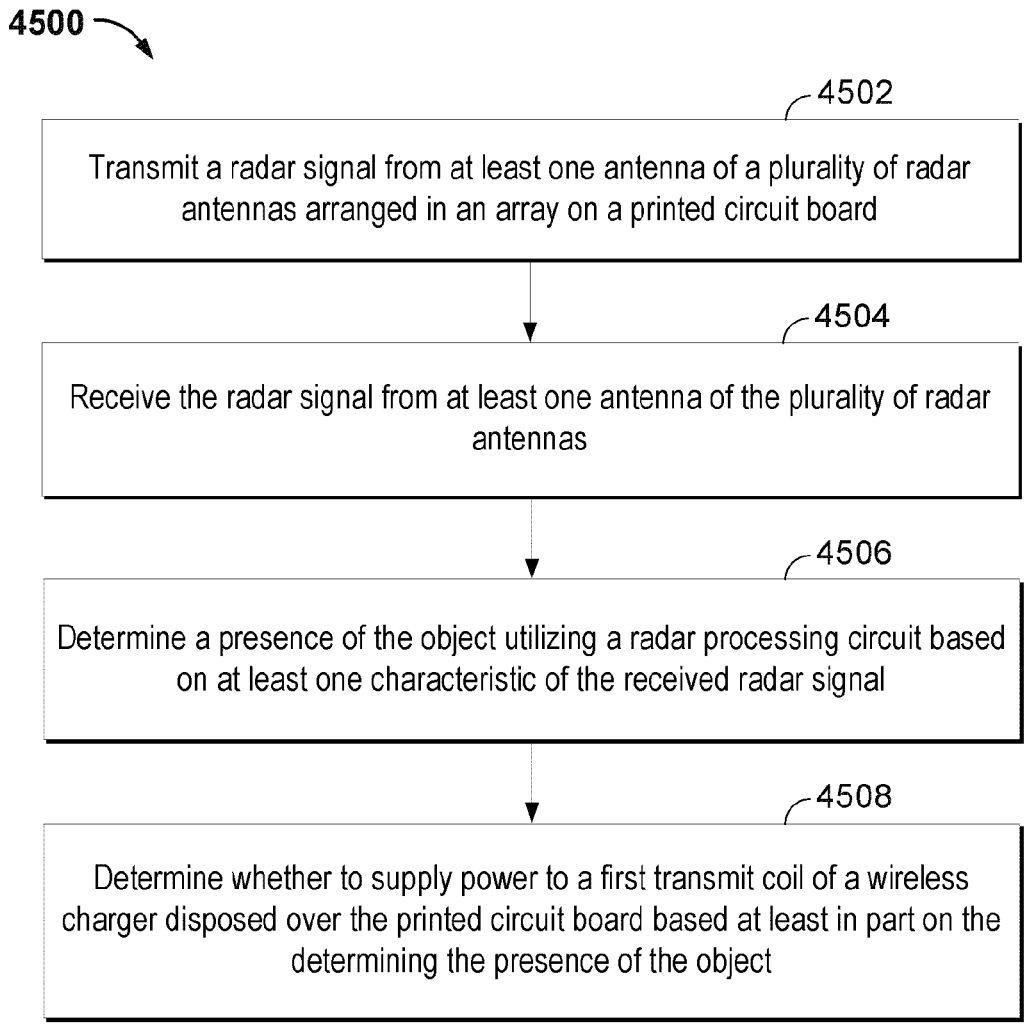
FIG. 45 is another flowchart of an exemplary method for radar-based detection of objects in a predetermined space, in accordance with an exemplary implementation.

FIG. 45 is another flowchart 4500 of an exemplary method for radar-based detection of objects in a predetermined space, in accordance with an exemplary implementation. The steps or actions described in FIG. 45 may be implemented in, or carried out by, any of the circuits, devices, or arrangements shown in FIGS. 6, 8-12, 17-20 and 25-28 as further discussed in connection with any of FIGS. 29-43. Block 4502 may include transmitting a radar signal from at least one antenna of a plurality of radar antennas arranged in an array on a printed circuit board. Block 4504 may include receiving the radar signal from at least one antenna of the plurality of radar antennas. Block 4506 may include determining a presence of the object utilizing a radar processing circuit based on at least one characteristic of the received radar signal. For example, in one implementation, the radar processing circuit may be a circuit as previously described in connection with either of FIGS. 8 and 9. Block 4508 may include determining whether to supply power to a first transmit coil of a wireless charger disposed over the printed circuit board based at least in part on the determining the presence of the object.

Figure 46:
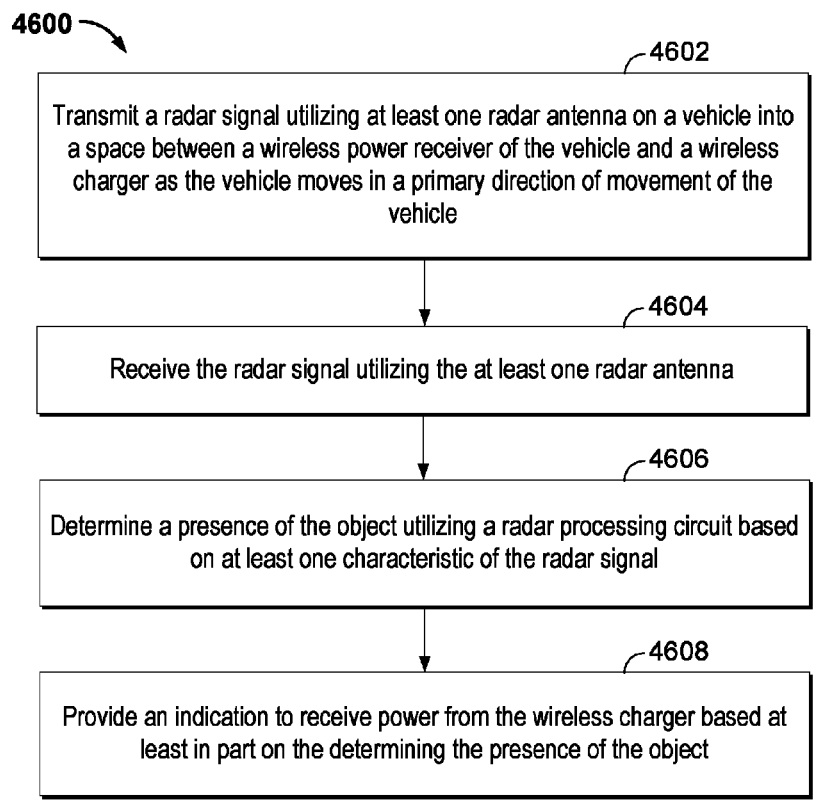
FIG. 46 is another flowchart of an exemplary method for radar-based detection of objects in a predetermined space, in accordance with an exemplary implementation.

FIG. 46 is another flowchart 4600 of an exemplary method for radar-based detection of objects in a predetermined space, in accordance with an exemplary implementation. The steps or actions described in FIG. 46 may be implemented in, or carried out by, any of the circuits, devices, or arrangements shown in FIGS. 8-12, 47 and 48. Block 4602 may include transmitting a radar signal utilizing at least one radar antenna on a vehicle into a space between a wireless power receiver of the vehicle and a wireless charger as the vehicle moves in a primary direction of movement of the vehicle. Block 4604 may include receiving the radar signal utilizing the at least one radar antenna. Block 4606 may include determining a presence of the object utilizing a radar processing circuit based on at least one characteristic of the radar signal. For example, in one implementation, the radar processing circuit may be a circuit as previously described in connection with either of FIGS. 8 and 9. Block 4608 may include providing an indication to receive power from the wireless charger based at least in part on the determining the presence of the object.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and method steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose hardware processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the implementations disclosed herein may be embodied directly in hardware, in a software module executed by a hardware processor, or in a combination of the two. If implemented in software, the functions may be stored on or transmitted as one or more instructions or code on a tangible, non-transitory computer readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The hardware processor and the storage medium may reside in an ASIC. The ASIC may reside in a user terminal. In the alternative, the hardware processor and the storage medium may reside as discrete components in a user terminal.

For purposes of summarizing the disclosure, certain aspects, advantages and novel features have been described herein. It is to be understood that not necessarily all such advantages may be achieved in accordance with any particular implementation. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for detecting a presence of an object, comprising:
    a printed circuit board;
    at least one radar transmit antenna disposed on a center portion of the printed circuit board;
    a plurality of radar receive antennas disposed on a periphery of the printed circuit board, each configured to receive a radar signal from the at least one radar transmit antenna; and
    a first transmit coil of a wireless charger disposed over the printed circuit board.

2. The apparatus of claim 1, the first transmit coil encircling the at least one radar transmit antenna.

3. The apparatus of claim 1, further comprising a second transmit coil of the wireless charger disposed adjacent to the first transmit coil, the at least one transmit antenna disposed adjacent to a corner of and between each of the first and second transmit coils.

4. The apparatus of claim 1, further comprising a second transmit coil of the wireless charger disposed adjacent to the first transmit coil and the at least one radar transmit antenna comprising a first radar transmit antenna and a second radar transmit antenna, the first transmit coil encircling the first radar transmit antenna and the second transmit coil encircling the second radar transmit antenna.

5. The apparatus of claim 1, further comprising a radar processing circuit.

6. The apparatus of claim 5, wherein the radar processing circuit is configured to cancel crosstalk between the at least one radar transmit antenna and the plurality of radar receive antennas by:
    disconnecting the at least one radar transmit antenna and the plurality of radar receive antennas from the radar processing circuit;
    determining a crosstalk signal induced in the radar processing circuit; and
    subtracting the crosstalk signal from the received radar signal.

7. The apparatus of claim 5, wherein the radar processing circuit is configured to equalize an impulse response of the apparatus by:
    measuring the impulse response of the apparatus while a transmit antenna port of a radar processing unit is connected to a receive antenna port of the radar processing unit;
    applying an equalizing filter having an inverse function of the measured impulse response to the received radar signal.

8. The apparatus of claim 5, wherein the radar processing circuit is configured to detect the presence of the object utilizing at least one of:
    time-differential detection, wherein the radar processing circuit is configure to:
        filter the received radar signal;
        determine the presence of the object when the filtered received radar signal exceeds a predetermined threshold; and
    space-differential detection, wherein the radar processing circuit is configure to determine the presence of the object when the received radar signal from at least one of the subset of the plurality of radar receive antennas exceeds a predetermined threshold and the received radar signal from at least one other of the subset of the plurality of radar receive antennas does not exceed the predetermined threshold.

9. A method for operating an apparatus for detecting a presence of an object, comprising:
    transmitting a radar signal from at least one radar transmit antenna disposed on a center portion of a printed circuit board;
    receiving the radar signal utilizing at least a subset of a plurality of radar receive antennas disposed on a periphery of the printed circuit board;
    determining a presence of the object utilizing a radar processing circuit based on at least one characteristic of the received radar signal; and
    supplying power to a first transmit coil of a wireless charger disposed over the printed circuit board based at least in part on the determining the presence of the object.

10. The method of claim 9, the first transmit coil encircling the at least one radar transmit antenna.

11. The method of claim 9, further comprising supplying power to a second transmit coil of the wireless charger disposed adjacent to the first transmit coil, the at least one transmit antenna disposed adjacent to a corner of and between each of the first and second transmit coils.

12. The method of claim 9, the at least one radar transmit antenna comprising a first radar transmit antenna and a second radar transmit antenna, the first transmit coil encircling the first radar transmit antenna and a second transmit coil encircling the second radar transmit antenna.

13. The method of claim 9, further comprising cancelling crosstalk between the at least one radar transmit antenna and the plurality of radar receive antennas, the cancelling comprising:
    disconnecting the at least one radar transmit antenna and the plurality of radar receive antennas from a radar processing circuit;
    determining a crosstalk signal induced in the radar processing circuit; and
    subtracting the crosstalk signal from the received radar signal.

14. The method of claim 9, further comprising equalizing an impulse response of the apparatus, the equalizing comprising:
    measuring the impulse response while a transmit antenna port of a radar processing unit is connected to a receive antenna port of the radar processing unit;
    applying an equalizing filter having an inverse function of the measured impulse response to the received radar signal.

15. The method of claim 9, wherein the determining the presence of the object comprises at least one of:
  time-differential detection comprising:
    filtering the received radar signal;
    determining the presence of the object when the filtered received radar signal exceeds a predetermined threshold; and
  space-differential detection comprising determining the presence of the object when the received radar signal from at least one of the subset of the plurality of radar receive antennas exceeds a predetermined threshold and the received radar signal from at least one other of the subset of the plurality of radar receive antennas does not exceed the predetermined threshold.

16. An apparatus for detecting a presence of an object, comprising:
  at least one radar antenna attached to a wirelessly chargeable vehicle and configured to:
    transmit a radar signal into a space between a wireless power receiver of the vehicle and a wireless charger as the vehicle moves in a primary direction of movement of the vehicle;
    receive the radar signal;
  a radar processing circuit configured to:
    determine a presence of the object in the space based on at least one characteristic of the received radar signal utilizing at least one of:
    time-differential detection, wherein the radar processing circuit is configure to:
      filter the received radar signal;
      determine the presence of the object when the filtered received radar signal exceeds a predetermined threshold; and
    space-differential detection, wherein the radar processing circuit is configured to determine the presence of the object when the received radar signal from one of the at least one radar antennas exceeds a predetermined threshold and the received radar signal from another of the at least one radar antennas does not exceed the predetermined threshold; and
    provide an indication to receive power from the wireless charger based at least in part on the determining the presence of the object.

17. The apparatus of claim 16, the at least one radar antenna configured to be stored in a recess of the vehicle when not in use and deployed to a height outside of the recess sufficient to determine the presence of the object when in use.

18. The apparatus of claim 16, the at least one radar antenna configured to move in one of a rotating or swinging manner when in use.

19. The apparatus of claim 16, the at least one radar antenna comprising a plurality of radar antennas arranged in an array along a dimension substantially perpendicular to the primary direction of movement of the vehicle.

20. The apparatus of claim 16, the at least one radar antenna disposed a predetermined distance from the wireless power receiver in the primary direction of movement of the vehicle.

21. The apparatus of claim 16, wherein the radar processing circuit is configured to cancel crosstalk by:
  disconnecting the at least one radar antenna from the radar processing circuit;
  determining a crosstalk signal induced in the radar processing circuit; and
  subtracting the crosstalk signal from the received radar signal.

22. The apparatus of claim 16, wherein the radar processing circuit is configured to equalize an impulse response of the apparatus by:
  measuring the impulse response while a transmit antenna port of a radar processing unit is connected to a receive antenna port of the radar processing unit;
  applying an equalizing filter having an inverse function of the measured impulse response to the received radar signal.

23. A method for operating an apparatus for detecting a presence of an object, comprising:
  transmitting a radar signal utilizing at least one radar antenna on a vehicle into a space between a wireless power receiver of the vehicle and a wireless charger as the vehicle moves in a primary direction of movement of the vehicle;
  receiving the radar signal utilizing the at least one radar antenna on the vehicle;
  determining a presence of the object based on at least one characteristic of the received radar signal, wherein determining the presence of the object comprises at least one of:
  time-differential detection comprising:
    filtering the received radar signal;
    determining the presence of the object when the filtered received radar signal exceeds a predetermined threshold; and
  space-differential detection comprising determining the presence of the object when the received radar signal from the at least one radar antenna exceeds a predetermined threshold and the received radar signal from another of the at least one radar antenna does not exceed the predetermined threshold; and
  providing an indication to receive power from the wireless charger based at least in part on the determining the presence of the object.

24. The method of claim 23, further comprising:
  storing the at least one radar antenna in a recess of the vehicle when not in use; and
  deploying the at least one radar antenna to a height outside of the recess sufficient to detect the presence of the object when in use.

25. The method of claim 23, further comprising moving the at least one radar antenna in one of a rotating or swinging manner during one or both of the transmitting and the receiving.

26. The method of claim 23, further comprising cancelling crosstalk by:
  disconnecting the at least one radar antenna from a radar processing circuit of the apparatus;
  determining a crosstalk signal induced in the radar processing circuit; and
  subtracting the crosstalk signal from the received radar signal.

27. The method of claim 23, further comprising equalizing an impulse response of the apparatus, the equalizing comprising:
  measuring the impulse response while a transmit antenna port of a radar processing unit is connected to a receive antenna port of the radar processing unit;
  applying an equalizing filter having an inverse function of the measured impulse response to the received radar signal.

28. The method of claim 23, wherein the determining the presence of the object comprises identifying movement of a vehicle as a false presence of the object when the received radar signal from each of the at least one radar antennas exceeds a predetermined threshold.

* * * * *